United States Patent
Kyota et al.

(10) Patent No.: US 7,819,967 B2
(45) Date of Patent: Oct. 26, 2010

(54) METHOD OF PRODUCING AN ORGANIC FINE PARTICLE DISPERSION, ORGANIC FINE PARTICLE DISPERSION OBTAINED BY THE SAME, AND INK-JET RECORDING INK AND PAINT USING THE DISPERSION

(75) Inventors: Hirokazu Kyota, Kanagawa (JP); Hideki Maeta, Minami-ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 55 days.

(21) Appl. No.: 12/265,426

(22) Filed: Nov. 5, 2008

(65) Prior Publication Data
US 2009/0120325 A1 May 14, 2009

(30) Foreign Application Priority Data
Nov. 8, 2007 (JP) ............................. 2007-291354
Jun. 16, 2008 (JP) ............................. 2008-156356

(51) Int. Cl.
C09B 67/20 (2006.01)
C09B 37/00 (2006.01)
C09B 67/46 (2006.01)

(52) U.S. Cl. ................ 106/493; 106/412; 106/413; 106/497; 106/498; 106/499

(58) Field of Classification Search ............... 106/493, 106/499, 412, 413, 497, 498
See application file for complete search history.

(56) References Cited

U.S. PATENT DOCUMENTS

| 6,562,121 B2 | 5/2003 | Nickel et al. |
| 6,921,433 B2 | 7/2005 | Kuribayashi et al. |
| 7,160,380 B2 * | 1/2007 | Maeta et al. ............... 106/493 |
| 7,503,972 B2 * | 3/2009 | Nagasawa et al. .......... 106/493 |
| 2004/0138349 A1 | 7/2004 | Babler |
| 2006/0057485 A1 | 3/2006 | Teshima et al. |
| 2006/0090697 A1 | 5/2006 | Teshima et al. |
| 2007/0012221 A1 | 1/2007 | Maeta et al. |

FOREIGN PATENT DOCUMENTS

| EP | 1 364 997 A2 | 11/2003 |
| EP | 1 516 896 A1 | 3/2005 |
| EP | 1 693 423 | 8/2006 |
| JP | 2002-030230 A | 1/2002 |
| JP | 2002-282678 A | 10/2002 |
| JP | 2002-282679 A | 10/2002 |
| JP | 2003-026972 A | 1/2003 |
| JP | 2004-043776 A | 2/2004 |
| JP | 2006-104448 A | 4/2006 |
| JP | 2006-124556 A | 5/2006 |
| JP | 2007-039643 A | 2/2007 |
| WO | WO2007/091712 A1 * | 8/2007 |

OTHER PUBLICATIONS

Yuki Ganryo Handbook (Handbook of Organic Pigments), edited by Color Office, p. 45, with Concise Explanation of Document.
Extended European Search Report cited in corresponding European Patent Application No. 08 01 9427 dated Aug. 19, 2010.

* cited by examiner

*Primary Examiner*—Anthony J Green
(74) *Attorney, Agent, or Firm*—Buchanan, Ingersoll & Rooney, PC

(57) ABSTRACT

A method of producing a dispersion of organic fine particles having a volume average particle diameter (Mv) of 10 nm to 100 nm, which has the step of: subjecting an organic fine particle dispersion liquid containing a high molecular compound to heating treatment under flowing through a channel.

18 Claims, 6 Drawing Sheets

US 7,819,967 B2

METHOD OF PRODUCING AN ORGANIC FINE PARTICLE DISPERSION, ORGANIC FINE PARTICLE DISPERSION OBTAINED BY THE SAME, AND INK-JET RECORDING INK AND PAINT USING THE DISPERSION

FIELD OF THE INVENTION

The present invention relates to a method of producing an organic fine particle dispersion having excellent dispersion stability and to an inkjet recording ink and a paint each using the organic fine particle dispersion obtained by the same.

BACKGROUND OF THE INVENTION

Pigments generally exhibit vivid color tone and high coloring power, and they are widely used in many fields. Examples of use applications in which pigments are used include paints, printing inks, electrophotographic toners, ink-jet inks, and color filters. In particular, examples of pigments that require high performance, and that are of particular importance in practical use, are ink-jet ink pigments, and color filter pigments.

In recent years, reduction in color filter thickness has been strongly required for achieving an increase in pixel count of apparatus associated with imaging, such as liquid crystal displays, CCD sensors or digital cameras. To reduction in color filter thickness, it is essential that finer pigments be used in color filters. In addition, development of pigment fine particles with uniformity and minuteness is required for ensuring higher contrast in color filters. In other words, development of pigment fine particles with minuteness, uniformity and stability holds the key to achieving high performance of apparatus associated with imaging.

On the other hand, dyes have been so far used as coloring materials of ink-jet inks. However, dyes are inferior in water resistance and light stability. So, pigments have come to be used for improvements in ink-jet ink properties. And it is being tried to apply ink-jet technology to not only a printing purpose but also production of a wide variety of precision members. For example, ink-jet technology is expected as a technology for production of precision members, most notably color filters, which substitutes for traditional technologies including lithography and allows enhancement of design flexibility and significant increase in productivity. However, neither pigment fine particles suitable for such a technology and fully adaptable to those requirements nor ink-jet inks containing such pigment fine particles are present yet.

From this background, pigments are required to be fined down so as to have particle diameters on the order of, for example, several tens of nanometers, and that to undergo such particle-diameter control that the distribution of their particle diameters approaches a monodisperse distribution. However, it is difficult to obtain such pigments by use of a general breakdown method (crushing method). This is because such a method requires great amounts of time and energy for crushing down pigments to nanometer-size particles, so it has low productivity, and besides, it limits pigments usable therein. In addition, it is known that, when too high energy is applied in the crushing method, an adverse effect referred to as overdispersion, such as a thickening phenomenon by re-aggregation, is caused.

Contrary to this, a build-up method in which particles are made to grow in a gas phase or a liquid phase has been studied. For example, methods of forming organic compound particles in a micro-chemical process are disclosed, and those methods make it possible to obtain fine particles with efficiency.

Although particles fined down so as to have diameters of several tens of nanometers have advantages in transparency, coloring power and the like, they suffer reduction in dispersion stability because of an increase in their specific surface areas (see Yuki Ganryo Handbook (Handbook of Organic Pigments), edited by Color Office, page 45). By contrast, there is a proposal to form fine particles encapsulated in a polymer by subjecting a polymerizable compound and a fine particle pigment dispersion containing a polymerization initiator to polymerization reaction by heating in a flask (see JP-A-2004-43776, wherein "JP-A" means unexamined published Japanese patent application). According to this method, however, there is an apprehension that variations in yield and molecular weight of the polymer produced by polymerization reaction lead to variations in performance, and the radical polymerization adopted exclusively in Examples is vulnerable to oxygen. In particular, it is thought that the method of using a flask (referred to as a batch method) is responsible for a rise in cost when mass production is carried out, and besides, temperature control therein is difficult, so fluctuations of temperature can become a cause of variations in quality. In other words, it has been desired to further develop production methods for dispersions of organic nanoparticles, such as nanoparticles of an organic pigment, which can ensure higher dispersion stability.

On the other hand, microchemical processes have an advantage in that they allow exacting temperature control of channels, and the performance of reactions or the like by flowing solutions through heated channels has been examined. For instance, it is reported by JP-A-2002-30230 that a pigment precursor is introduced into a microreactor for the purpose of conditioning an organic pigment and subjected to heat treatment, thereby yielding the pigment with an excellent hue. Although the document cited describes feeding of the pigment-in-organic solvent suspension into a microreactor, it neither aims to impart dispersion stability for keeping a volume-average particle diameter and particle size distribution of an aqueous dispersion of organic pigment fine particles nor contains any mention thereof. That document describes, e.g., in Example that, when a suspension of organic pigment in N-methylpyrrolidone is conditioned by heating at 180° C., the average particle diameter is enlarged from less than 70 nm to 221 nm. In other words, improvement of dispersion stability by heating is not a general phenomenon, if anything, heating is unsuitable for retention of a volume-average particle diameter because it causes an increase in viscosity and coarsening of particles.

Further, the method of preparing an emulsified dispersion from an oily solution containing a microcapsule wall material and an aqueous solution and subjecting the dispersion to microencapsulation by use of a microreactor is disclosed (JP-A-2002-282678, JP-A-2002-282679). However, the microcapsules prepared by such a method have sizes on the order of micrometers, and besides, they are unsatisfactory in both monodisperse property and dispersion stability.

In addition, the method of using a block copolymer and the method of utilizing a fluid in a supercritical or subcritical state (JP-A-2006-104448, JP-A-2006-124556) are known with respect to the production of fine particles of an organic pigment on the basis of a build-up process. Although these microchemical processes allow preparation of fine pigment dispersions, production conditions thereof are sharply restricted and they are lacking in general versatility.

Furthermore, there is a disclosure (JP-A-2007-39643) of the production method for an organic pigment dispersion liquid, wherein a polymerizable compound is incorporated into at least either an alkaline or acid solution containing an organic pigment in a dissolved state, or an aqueous medium, the pigment is precipitated in the form of fine particles under the process of mixing the solution and the aqueous medium, and then the polymerizable compound is made to polymerize; as a result, the polymer formed is fixed to the fine particles of pigment. Although preparation of a dispersion of superfine particles having good dispersion stability is tried in such a way, production methods capable of sufficiently ensuring satisfactory characteristics as leading-edge industrial materials such as color filters and ink-jet inks, and that at low cost and with stability, are not found yet, so further developments are desired.

SUMMARY OF THE INVENTION

The present invention resides in a method of producing a dispersion of organic fine particles having a volume average particle diameter (Mv) of 10 nm to 100 nm, which comprises the step of:

subjecting an organic fine particle dispersion liquid containing a high molecular compound to heating treatment under flowing through a channel.

Further, the present invention resides in a dispersion of organic pigment fine particles obtained by the above mentioned production method.

Further, the present invention resides in an ink-jet recording ink, which is prepared by using a dispersion of organic pigment fine particles obtained by the above mentioned production method, and which contains in an aqueous medium of the dispersion liquid the organic pigment fine particles and the high molecular compound or a thermally cross-linked product thereof.

Further, the present invention resides in a paint (coating material), which is prepared by using a dispersion of organic pigment fine particles obtained by the above mentioned production method, and which contains in an aqueous medium of the dispersion liquid the organic pigment fine particles and the high molecular compound or a thermally cross-linked product thereof.

Other and further features and advantages of the invention will appear more fully from the following description, appropriately referring to the accompanying drawings.

BRIEF DESCRIPTION OF THE DRAWINGS

FIG. 1-2 is a sectional view taken on line I-I of FIG. 1-1.

FIG. 2-1 is an vertical section view of one embodiment of a reactor for use in a method of the present invention, which reactor has a cylindrical tube-type channel in which a channel is provided to insert at one side thereof.

FIG. 2-2 is a sectional view taken on line IIa-IIa of FIG. 2-1.

FIG. 2-3 is a sectional view taken on line IIb-IIb of FIG. 2-1.

FIG. 3-1 is a plane view of one embodiment of a reactor for use in a method of the present invention, which reactor has Y-shaped channels on both sides.

FIG. 3-2 is a sectional view taken on line III-III of FIG. 3-1.

DETAILED DESCRIPTION OF THE INVENTION

Figure 1:
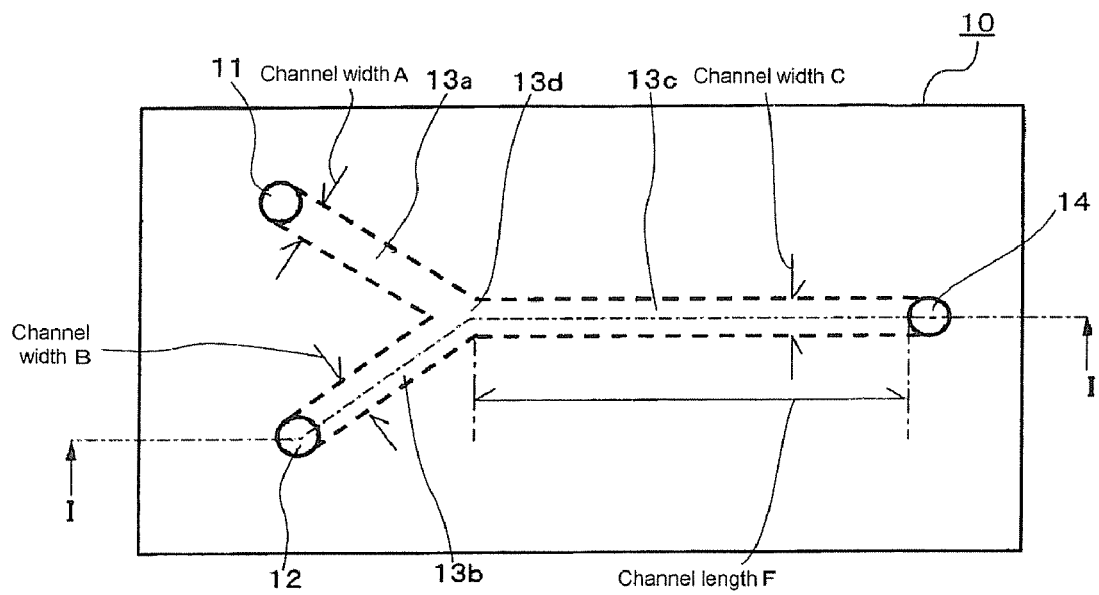
FIG. 1-1 is an plane view of one embodiment of a reactor for use in a method of the present invention, which reactor has a Y-shaped channel on one side.

According to the present invention, there is provided the following means.

(1) A method of producing a dispersion of organic fine particles having a volume average particle diameter (Mv) of 10 nm to 100 nm, which comprises the step of:

subjecting an organic fine particle dispersion liquid containing a high molecular compound to heating treatment under flowing through a channel.

(2) The method of producing an organic fine particle dispersion as described in (1), wherein the organic fine particle dispersion liquid further contains a compound having a cross-likable functional group.

(3) The method of producing an organic fine particle dispersion as described in (1) or (2), wherein the high molecular compound has a cross-linkable functional group.

(4) The method of producing an organic fine particle dispersion as described in (2) or (3), wherein the high molecular compound, or the compound having a cross-linkable functional group, or both are made to form cross-links through reaction of the cross-linkable functional group during the step of heating treatment.

(5) The method of producing an organic fine particle dispersion as described in (4), wherein the cross-links are formed from combination of at least one functional group selected from the group consisting of an aldehyde group, an epoxy group and a carboxylic anhydride structure with at least one functional group selected from the group consisting of a hydroxyl group and an amino group.

(6) The method of producing an organic fine particle dispersion as described in any one of (1) to (5), wherein the volume average particle diameter (Mv) of organic fine particles is from 10 nm to 50 nm.

(7) The method of producing an organic fine particle dispersion as described in any one of (1) to (6), wherein the channel has an equivalent diameter of 0.1 mm to 16 mm in a segment where the heating treatment is carried out.

(8) The method of producing an organic fine particle dispersion as described in any one of (1) to (7), wherein the organic fine particle dispersion is an aqueous dispersion liquid.

(9) The method of producing an organic fine particle dispersion as described in any one of (1) to (8), wherein the high molecular compound is soluble in water.

(10) The method of producing an organic fine particle dispersion as described in any one of (1) to (9), wherein the heating treatment is carried out at a temperature of 50° C. to 100° C.

(11) The method of producing an organic fine particle dispersion as described in any one of (1) to (10), wherein duration of the heating treatment which the dispersion liquid flowing through the channel undergoes is 20 seconds or more.

(12) The method of producing an organic fine particle dispersion as described in any one of (1) to (11), wherein the organic fine particle dispersion liquid containing a high molecular compound is a dispersion liquid prepared by mixing a solution of an organic compound dissolved by use of an acid or an alkali with a precipitation solvent in the presence of the high molecular compound inside a channel of a microreactor apparatus and forming a precipitate as fine particles of the organic compound.

(13) The method of producing an organic fine particle dispersion as described in (12), wherein the step of precipitating the fine particles and the subsequent heating treatment step under feeding the dispersion liquid through the channel are performed under a series of solution feedings by use of the microreactor apparatus.

(14) The method of producing an organic fine particle dispersion as described in (12) or (13), wherein the channel of the microreactor apparatus is designed to have an equivalent diameter of 1 mm or less.

(15) The method of producing an organic fine particle dispersion as described in any one of (1) to (14), wherein the organic fine particles are fine particles of an organic pigment.

(16) A dispersion of organic pigment fine particles obtained by the production method described in any one of (1) to (15).

(17) An ink-jet recording ink, which is prepared by using a dispersion of organic pigment fine particles obtained by the production method described in any one of (1) to (15), and which contains in an aqueous medium of the dispersion liquid the organic pigment fine particles and the high molecular compound or a thermally cross-linked product thereof.

(18) A paint, which is prepared by using a dispersion of organic pigment fine particles obtained by the production method described in any one of (1) to (15), and which contains in an aqueous medium of the dispersion liquid the organic pigment fine particles and the high molecular compound or a thermally cross-linked product thereof.

The production method of the present invention is described below in detail.

In the production method of the present invention, the organic fine particle dispersion liquid containing a high molecular compound undergoes heating treatment, and the concentration of organic fine particles in the dispersion liquid is preferably from 0.02 mass % to 20 mass %, more preferably from 0.1 mass % to 10 mass %, particularly preferably from 0.3 mass % to 5.0 mass %. The concentration of the high molecular compound the presence of which is required at the time of heating treatment in the present invention is preferably from 1 to 300 mass %, more preferably from 5 to 150 mass %, particularly preferably from 10 to 70 mass %, with respect to the organic fine particles from the viewpoints of maintaining particle diameters of organic fine particles, ensuring dispersion stability, controlling a rise in viscosity of the dispersion liquid, controlling an increase in pressure inside the channel, preventing a clogging of the channel, facilitating concentration processing, and the like.

The heating treatment temperature, though it depends on the kinds and amounts of a high molecular compound and organic fine particles used, is preferably from 40° C. to 100° C., more preferably from 50° C. to 100° C., particularly preferably from 60° C. to 95° C. The temperature of the organic fine particle dispersion liquid before the heating treatment is preferably 60° C. or less, more preferably from 0 to 40° C., particularly preferably from 10° C. to 40° C. These temperatures may be determined in consideration of the temperature at which a precipitation process of the organic fine particles is performed inside a microreactor apparatus according to a build-up method. More specifically, the temperature before the heating treatment ($T_1$) is set at a temperature lower than the heating treatment temperature ($T_2$), and the temperature difference ($T_2-T_1$) between them is adjusted preferably to fall within a range of 20° C. to 90° C., more preferably within a range of 30° C. to 90° C., particularly preferably within a range of 40° C. to 80° C.

According to the production method of the present invention, preferred embodiments thereof can produce great effects, such as an effect of preventing the dispersion obtained from suffering a rise in viscosity (as a result, easy concentration becomes feasible, the ink-jet ink prepared from the dispersion obtained can have an improved discharge capability, and the like), an effect of controlling a change in particle diameter with a lapse of time and maintaining transparency, and the like. Factors creating these effects can be assumed as follows.

It is thought that the heating treatment in the present invention allows the coexistent state of the high molecular compound to reach to its thermodynamically stable state in the dispersion liquid containing fine particles having the specified volume-average particle diameter. More specifically, it is presumed that the heating treatment enables reduction in quantity of the high molecular compound floating in a dispersion medium without adsorbing to fine particles and promotes creation of a state that the high molecular compound is adsorbed uniformly to fine particles. The synthesis of fine particles by a build-up method or by a method in which formation of fine particles is completed instantaneously by means of a microreactor does not include a process of applying mechanical energy for a long time such that a crushing method includes. Therefore, it is thought instead that such synthesis tend to bring about a condition that the high molecular compound cannot reach to a stable state and thereby causes an increase in viscosity and a change in particle diameter. By contrast, as mentioned above, the heating treatment in the present invention can promote stabilization of the state in which the high molecular compound is present.

In other preferred embodiments of the production method of the present invention, cross-linking treatment under heating can be given to the high molecular compound or performed by use of another compound having a cross-linkable functional group, and thereby the dispersion stability can be greatly heightened. As a reason for this, the following can be supposed. That is, when those compounds are adsorbed to surfaces of fine particles, hydrophilic/hydrophobic properties of the high molecular compound are important as factors responsible for changes in their adsorption states. Since cross-linkable functional groups introduced in the high molecular compound form hydrophilic moieties, they are assumed to be aligned uniformly on particle surfaces and adsorbed firmly thereto. When cross-linking treatment is carried out in such an aligned state, the high molecular compound molecules are linked together. In bifunctional or higher cases, the molecules can reticulate and a network thereof can cover all over the particle surfaces. And it is thought that, when a compound having a high molecular weight is used and cross-linking treatment is given thereto, steric repulsion acting between networks can also contribute greatly to enhancement of dispersion stability, so the effect of uniform alignment becomes high. Further, the organic fine particles in the present invention are ultra-small and of the order of nanometers in size, so the specific surface areas thereof are very large. Therefore, it is supposed to be more advantageous thermodynamically and kinetically for the compound molecules having cross-linkable functional groups aligned on the particle surfaces to be cross-linked between adjacent molecules aligned on the same particle than between molecules on different particles, which can produce great effect on stabilization of dispersion.

In the production method of the present invention, the diameter of a channel for performing heating treatment has no particular limits, but the equivalent diameter of the heating treatment segment of the channel is preferably from 0.1 mm to 16 mm, more preferably from 0.2 mm to 10 mm.

The equivalent diameter is a term also called a corresponding diameter, which is used in mechanical engineering field. If a cylindrical pipe equivalent to the pipe (channel in the present invention) having any sectional shape is assumed, the diameter of the equivalent cylindrical pipe corresponds to the equivalent diameter. The equivalent diameter ($d_{eq}$) is defined as $d_{eq}=4 A/p$ in which A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a); $d_{eq}=a/\sqrt{3}$ in an equilateral triangular pipe having a side (a); and $d_{eq}=2$ h in a flow between paralleled plates having a channel height (h) (see, for example, edited by Nippon Kikai Gakkai, "Kikai Kougaku Jiten," 1997, published by Maruzen, K. K.).

Reduction in diameter of the channel and thickness of the channel wall can expedite heat exchange, and allows a quick rise of the internal temperature of the channel to almost the same temperature as the external temperature. In addition, these reductions make it feasible to evenly heat the liquid in its entirety to a uniform temperature within a given period of time. On the other hand, there may be cases where the amount of a liquid heated per unit time becomes small and a heating time is too short. Therefore, it is preferred that a channel having an appropriate diameter be chosen in response to the intended purpose. For instance, a small-diameter channel can be used for the purpose of performing speedy heat exchange and further thereto a large-diameter channel can be connected for the purpose of securing a sufficient heating time, which is one preferred embodiment of the present invention.

The heating treatment segment of a channel has no particular restrictions as to the flow velocity therein and the length thereof, and these settings can be adjusted appropriately. However, it is preferable that the combination of a channel diameter, a velocity of a flowing liquid and a channel length in the heating treatment segment of a channel is selected so as to ensure a heating time of 10 seconds or more for a liquid flowing through the heating treatment segment. When the heating time is too short, the desired effects cannot be achieved in some cases. Though it has no upper limit in particular, the heating time is preferably 5 hours or less, more preferably from 15 seconds to 3 hours, still more preferably from 20 seconds to 2.5 hours, particularly preferably from 60 seconds to 2.5 hours, from the viewpoints of particle-diameter retention and production cost.

The production method of the present invention has no particular restriction as to a specific apparatus for carrying out heating of an organic fine particle dispersion liquid inside the channel. In one embodiment of apparatus usable therefor, an organic fine particle dispersion liquid is prepared by means of a microreactor as illustrated hereinafter (any of FIG. 1 to FIG. 8) and a tube as the channel for heating is connected to the exit of the microreactor. By having such a structure, the precipitation of fine particles and the heating process can be carried out continuously, and can be configured as a series of processes. Therefore, this mode is particularly advantageous in terms of cost and operability. The embodiment of an apparatus containing a channel for heating an organic fine particle dispersion liquid is not limited to the foregoing, but a mode in which the microreactor as shown in any of FIG. 1 to FIG. 8 is placed in a constant temperature bath and kept in a heat-retained state is also another preferred embodiment of the apparatus. Further, it is also preferable to employ a method of working upon a part of the channel in a microreactor so as to enable heating or cooling by use of a heater, a Peltier element or the like. These embodiments are not limited to performance on a stand-alone basis, but some of them may be performed in a state of being combined so as to agree with their heating methods. Incidentally, detailed descriptions of the equivalent diameter and the microreactors shown in FIG. 1 to FIG. 8 are given hereinafter in relation to embodiments of the preparation of an organic fine particle dispersion liquid.

The particle diameter (in the present invention, the particle diameter refers to a diameter of a particle) of the organic pigment fine particles produced by the production method of the present invention are not particularly limited, but the average particle diameter is preferably nanometer-size (less than 1 μm), and the volume average particle diameter (Mv) measured in the dispersion containing the pigment fine particles by a dynamic light scattering method is preferably from 10 nm to 100 nm, more preferably 50 nm or less. As to the monodispersibility, a value (Mv/Mn) obtained by dividing a volume average particle diameter Mv by a number average particle diameter Mn may be expressed as an index. The value Mv/Mn is preferably 1.8 or less, more preferably 1.6 or less, and particularly preferably 1.4 or less. The production method of the present invention is outstanding for resolution of a dispersion-stability problem emerging as organic fine particles are reduced in size, and suitable as a method of providing a dispersion liquid which can satisfy both transparency (i.e., smallness of particle diameter) and dispersion stability (a property of resisting changes in liquid viscosity and particle diameter even after a lapse of time).

Particle diameter measurements on organic fine particles can be made by use of microscopy, dynamic light scattering, an electrical resistance method or the like. However, the present invention adopts as the particle diameter a value measured by dynamic light scattering (measuring instrument: Nanotrac UPA-EX150, trade name; a product of Nikkiso Co., Ltd.) unless otherwise specified. Additionally, the particle diameters of organic fine particles in a dispersion liquid or a dispersion are values measured under a fine particle concentration of 0.2 mass % unless otherwise indicated.

Incidentally, organic fine particles may be made up of either only one or more than one kind of organic compound, or may contain an ingredient other than organic compounds.

The term "dispersion" as used in the present invention refers to a composition prepared by dispersing given fine particles into a medium, and the composition has no particular restriction on its state. So, it is intended to include a liquid composition (dispersion liquid), a paste composition and a solid composition. In the organic pigment fine particle dispersion produced by the production method of the present invention, the content of organic pigment fine particles, though not particularly limited, is preferably from 0.1 to 50% by mass, more preferably from 0.5 to 25% by mass.

Further, it is preferable that the organic fine particle dispersion obtained by the production method of the present invention contains the organic fine particles of nanometer sizes and a high molecular compound or its cross-linked substance in an aqueous medium. At this time, the organic fine particles and the high molecular compound or its cross-linked substance may be present in isolation from each other or in an integrated state in the aqueous medium. In the present invention, it is preferable that the high molecular compound or its cross-linked substance is present in a dispersion in a state of being integrated with organic fine particles so that the organic fine particles are wrapped in the high molecular compound or its cross-linked substance with or without partial incorporation of the high molecular compound or its cross-linked substance into the organic fine particles. The organic fine particle dispersion may further contain ingredients other than the organic fine particles and the high molecular compound. Incidentally, these things are true for ink-jet recording inks or paints described hereinafter.

In the production method of the present invention, depending on the chemical species of an organic compound that forms organic fine particles, there are cases where the organic fine particles change their crystal form under heating. The production method of the present invention may be adjusted for such a property, dispersion characteristics obtained by utilizing such a change or the like.

In the production method of the present invention, the organic fine particle dispersion liquid to be heated contains a high molecular compound. The term "high molecular compound" as used in the present invention is defined as a compound having a repeated structure and a mass-average molecular weight of 1,000 or more. The term "repeated structure" refers to the structure including a repeat of a specified partial structure (repeating units). For instance, when polymerization reaction is conducted by using a polymerizable compound as a raw material, a polymer including a repeat of the partial structure derived from the raw material is obtained. It is preferred that a polymer capable of functioning as a dispersing agent be used as the high molecular compound. In addition, it is preferable that the high molecular compound contained in the organic fine particle dispersion liquid used in the present invention is soluble in water. The expression "soluble in water" means that the solubility of the high molecular compound in water is at least 0.1%, preferably at least 0.2%, more preferably from 1% to 20%. The term "weight-average molecular weight" as used herein refers to the weight-average molecular weight measured by gel permeation chromatography (carrier: tetrahydrofuran) and calculated in terms of polystyrene.

Examples of the polymer dispersing agent, in particular, which can be preferably used in the second and third embodiments, include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, tragacanth gum, and ligninsulfonic acid salts.

Of the high molecular compounds recited above, polyvinyl pyrrolidone, polyvinyl alcohol, polyvinyl methyl ether, polyethylene oxide, polyethylene glycol, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, and methacrylic acid ester/methacrylic acid salt copolymers are preferable.

Among all of these polymers, polyvinyl pyrrolidone is most preferred. Some of those high molecular compounds can function as polymer dispersants. Those high molecular compounds can be used alone or as combinations of two or more thereof.

The mass-average molecular weight of a high molecular compound for use in the present invention is 1,000 or more, preferably from 2,000 to 500,000, more preferably from 5,000 to 100,000.

When the high molecular compound used in the production method of the present invention is a copolymer, the copolymer may be a block copolymer having some segments. In general, block copolymers having polyacrylic, polymethacrylic, polyoxyethylene, polyoxyalkylene or polystyrene segments and addition polymer or condensation polymer segments are known. In particular, amphipathic polymers including combinations of the same kind or different kinds of hydrophobic blocks and hydrophilic blocks are far preferred. Although no limits are imposed on the numbers of hydrophilic blocks and hydrophilic blocks to be combined, the block copolymer contains at least one kind of hydrophilic block and at least one kind of hydrophobic block. Examples of functional groups contained in a hydrophilic block include carboxylic acid groups, sulfonic acid groups, phosphoric acid groups, hydroxyl groups and alkylene oxides. The hydrophilic block preferably contains at least one kind of groups chosen from the groups recited above. Of those functional groups, carboxylic acid groups, sulfonic acid groups and hydroxyl groups are preferable to the others, carboxylic acid groups and hydroxyl groups are preferable to sulfonic acid groups, and carboxylic acid groups are especially preferred. In this way, a role of adsorption sites for organic fine particles and a function of strengthening the dispersion stability through steric repulsion and/or electrostatic repulsion can be imparted to the dispersing agent. These block copolymers may be used alone or as combinations of two or more thereof. In the present invention, it is preferred that at least one kind of polymerizable compound and at least one kind of block copolymer be used in combination. By such a combined use, stronger fixation becomes feasible at the time of formation of organic compound fine particles, and significant improvement in dispersion stability can be expected.

The organic fine particle dispersion liquid, which is used in the production method of the present invention and subjected to heating treatment under flowing through a channel, from the viewpoint of preventing an increase in particle diameter, is preferably an aqueous dispersion liquid prepared by dispersing organic fine particles into an aqueous medium. The term "aqueous dispersion liquid" as used herein refers to the liquid containing at least 50 vol % of water though a water-soluble organic solvent may be contained therein. And it is preferable that the water content in the aqueous dispersion liquid is 70 vol % or more.

In the present invention, the "aqueous medium" refers to water alone, or a mixed solvent of water and an organic solvent soluble in water. The addition of the organic solvent is preferably used, for example, (i) in the case where only water is not sufficient for uniformly dissolving a pigment and a dispersing agent, (ii) the case where only water is not sufficient for obtaining viscosity required for the flow through a flow path, and the like. In the case of alkaline, the organic solvent is preferably an amide-compound solvent or a sulfur-containing compound solvent, more preferably the sulfur-containing compound solvent and particularly preferably dimethylsulfoxide (DMSO). In the case of the acidic, the organic solvent is preferably a carboxylic acid-compound solvent, a sulfur-containing compound solvent or a sulfonic acid-compound solvent, more preferably a sulfonic acid-compound solvent and particularly preferably methanesulfonic acid. Additionally, an inorganic compound salt and a dispersing agent as described below may be dissolved into an aqueous medium as required.

The method for preparing an organic fine particle dispersion liquid for use in the present invention is not limited to particular ones, and it can be chosen from a build-up method, a crushing method or the like as appropriate. And it is advantageous for the organic fine particle dispersion liquid to be prepared by a build-up method. Although the dispersion medium also has no particular limitation and can be chosen as appropriate, an aqueous medium is far preferred as the dispersion medium. Examples of a preferred dispersion medium include water (which may contain a salt), alcohol compounds (e.g., methanol, ethanol, ethylene glycol monoether), esters (e.g., ethyl acetate, ethylene glycol monoester), ketones (e.g., acetone, 2-butanone), amides (e.g., N,N-dimethylformamide, N,N-dimethylacetamide, N-methylpyrrolidone), dimethyl sulfoxide, and mixtures of two or more of the above-recited ones. In particular, liquids containing water as a main component (those containing at least 50 vol % of water) are preferred.

In the present invention, the build-up method is defined as a method of forming nanometer-size organic pigment particles from an organic compound or an organic compound precursor dissolved in a solvent (molecular dispersion) through chemical operation and processing without requiring any additional fining operation, such as a crushing operation. Although the build-up method is roughly classified into a vapor-phase method and a liquid-phase method, it is preferable in the present invention that the fine particles are formed according to a liquid-phase method.

The organic compounds usable as a raw material of the organic fine particles in the production method of the present invention are preferably compounds that have low solubility in precipitation solvents and are isolated from their solutions in the form of liquids or solids when mixed with the precipitation solvents, more preferably those separating out in the form of solids.

In the production method of the present invention, a precursor monomer of organic fine particles may be used as a raw material of organic fine particles synthesized by the build-up method. More specifically, in an embodiment of the production method of the present invention, a dispersion of a precursor monomer of organic fine particles (including a case where the monomer to be formed is in a liquid state, namely a case of emulsion) is prepared by the build-up method, and then the precursor monomer of organic fine particles is polymerized by polymerization operations and converted into polymer fine particles. This polymerization process of the precursor monomer of organic fine particles and a process for polymerizing a polymerizable compound, which is described hereinafter, may be carried out successively or simultaneously. According to this method, organic fine particles covered with another kind of polymer (a polymer of a polymerizable compound), such as fine particles of core-shell type, can be obtained.

Next, a precipitation solvent brought into contact with a solution of an organic compound (hereinafter referred simply to as "a precipitation solvent", too) is described. Since the kind of a precipitation solvent to be used depends on the kinds of the good solvent and the organic compound used in combination therewith, and the like, it is difficult to choose only the precipitation solvent by itself. However, the precipitation solvent is preferably a poor solvent for the organic compound dissolved in a good solvent and the solubility of the organic compound therein is preferably 0.1 or less. The combination of a good solvent and a precipitation solvent is preferably a combination formed of a solvent chosen as the good solvent in which the organic compound has solubility of 1 or more and a solvent chosen as the precipitation solvent in which the organic compound has solubility of 0.1 or less (the term "solubility" as used herein is defined as the concentration of a solute in a saturated solution and expressed in amount (number of grams) of a solute in 100 g of the solution).

It is preferred that the precipitation solvent at least be partially diffusible into a good solvent. The expression "at least be partially diffusible" as used in the present invention means that, when both solvents are stirred vigorously in a beaker and then allowed to stand for 24 hours or more, the proportion of the precipitation solvent dissolving in the good solvent is 10 mass % or more. At this time, it is preferable that the precipitation solvent is in a homogeneously dissolved state and neither precipitates nor deposits are formed. In the production method of the present invention, as mentioned above, the precipitation solvent used has a compatibility with the good solvent to such an extent that the proportion of the precipitation solvent homogeneously mixed in the good solvent is 10 mass % or more. However, it is preferable that the precipitation solvent has a compatibility of such an extent that the proportion of the precipitation solvent homogeneously mixable in the good solvent is 50 mass % or more, and it is more preferable that the precipitation solvent has a compatibility of such an extent that the proportion of the precipitation solvent homogeneously mixable in the good solvent is from 100 mass % to infinity.

As to the combination of a good solvent and a precipitation solvent, when the good solvent is, e.g., a halogen-containing solvent, examples of a solvent capable of functioning as the precipitation solvent include hydrocarbon solvents (such as n-hexane and toluene) and ester solvents (such as ethyl acetate). Depending on the good solvent used in combination, a solvent suitable as the precipitation solvent is an aqueous medium, an alcohol solvent or a hydrocarbon solvent. Of these solvents, an aqueous medium is especially preferable. Those precipitation solvents may be used alone or as a mixture of two or more thereof. To the organic compound solution and the precipitation solvent, inorganic or organic salts, acids, alkalis or the like may further be added, if needed.

When the organic fine particles to be precipitated are fine particles of organic pigment, it is preferable that an aprotic polar solvent (such as dimethyl sulfoxide, N,N-dimethylformamide or N-methylpyrrolidone, most notably dimethyl sulfoxide) is used as the good solvent and an aqueous medium is used as the precipitation solvent. In addition, it is preferred that an alkali or acid be added to the good solvent for the purpose of dissolving the organic compound to form organic fine particles. Whether dissolution of the organic compound is carried out under an acidic condition or alkaline condition is chosen depending on which condition allows more homogeneous dissolution of the organic compound. In general, when the organic compound contains an alkali-dissociable group in its molecule, the alkaline condition can be chosen; while, when the organic compound contains in its molecule no alkali-dissociable group but many nitrogen atoms susceptible to protonation, the acidic condition can be chosen. In the present production method, it is advantageous for the dissolution to be performed on condition that an alkali is added to the greatest extent practicable.

The method of dissolving organic pigments or organic compounds other than organic pigments (hereinafter collectively referred to as "organic compounds") is not particularly limited, but the use of an alkali or acid is preferable. It depends on the nature of the organic compound whether the organic compound in interest may be more easily dissolved homogeneously under either alkaline or acidic, to select the conditions in which the organic compound be dissolved under alkaline or dissolved under acidic. In general, in the case of the organic compound having in the molecule thereof a group dissociative under alkaline, the alkaline medium is used, and in the case of the organic compound having no group dissociative under alkaline and having in the molecule thereof many nitrogen atoms, to which protons easily adhere, the acidic medium is used. For example, quinacridone-, diketopyrrolopyrrole-, and condensed disazo-compound pigments can be dissolved in the alkaline medium more homogenously, and a phthalocyanine-compound pigment can be dissolved in the acidic medium more homogenously. It is especially preferable to apply the producing method of the present invention to cases where organic compound solutions can be prepared by dissolving organic compounds into alkalis. In the case of using acids for dissolution of organic compounds, there are restrictions on usable reactors because metallic apparatus susceptible to corrosion is difficult to use under usual conditions.

Examples of a base that can be used in the case that the pigment is dissolved in alkaline medium, include inorganic bases, such as sodium hydroxide, potassium hydroxide, calcium hydroxide, and barium hydroxide; and organic bases, such as trialkylamine, diazabicycloundecene (DBU), metal alkoxides ($NaOCH_3$, $KOC_2H_5$), tetraalkylammonium methoxide(tetramethylammonium methoxide) and tetraalkylammonium hydroxide(tetramethylammonium hydroxide). Among these, inorganic bases are preferable.

The amount of the base to be used is not particularly limited, as long as the base in the amount can make the organic compound be dissolved homogeneously. In the case of the inorganic base, the amount thereof is preferably from 1.0 to 30 mole equivalents, more preferably from 2.0 to 25 mole equivalents, and further preferably from 3.0 to 20 mole equivalents, to the organic compound. In the case of the organic base, the amount thereof is preferably from 1.0 to 100 mole equivalents, more preferably from 5.0 to 100 mole equivalents, and further preferably from 20 to 100 mole equivalents, to the organic compound.

Examples of an acid to be used in the case that the organic compound is dissolved in the acidic medium, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the organic compound.

Although the mixing ratio between an organic compound solution and a precipitation solvent varies depending on the kind of the organic compound to be formed into fine particles, the desired fine particle size and the like, the precipitation solvent/organic compound solution ratio (by mass) is preferably from 0.01 to 100, more preferably from 0.05 to 10.

The solution containing an organic compound in a homogeneously dissolved state and the precipitation solvent are preferably mixed by feeding them into channels having their individual lengths in the same longitudinal direction and bringing them into contact with each other during the passage through the channels, thereby forming a precipitate of organic fine particles. When a suspension is introduced into the channel, the size of the particles therein may become large or pigment fine-particles having a wide particle size distribution may be generated. This results, as the case may be, to be apt to block the channel. The wording "homogeneously dissolved" means a solution in which turbidity (muddiness) is hardly observed when the solution is observed under visible light. In the present invention, a solution obtained by filtration through a micro-filter having pores of 1 μm or less in diameter, or a solution which does not contain any substance remaining after the solution is filtrated through a filter having pores of 1 μm or less in diameter, is defined as a homogeneously dissolved solution (or a homogeneous solution).

In the producing method of the present invention, it is preferable that organic pigment fine particles are precipitated according to a coprecipitation method. The term "coprecipitation method" as used in the present invention is defined as a method of performing a precipitation operation of pigment fine particles by bringing a solution prepared by dissolving an organic pigment into a good solvent (molecular dispersion) into contact with a poor solvent (e.g., an aqueous medium) in the presence of a dispersing agent. Sometimes the method which, though based on the coprecipitation method, dispenses with a dispersing agent in precipitating pigment fine particles is referred specifically to as a reprecipitation method in distinction from the coprecipitation method. For details of the reprecipitation method, JP-A-2004-91560 or the like can be referred to. For details of the coprecipitation method, on the other hand, JP-A-2003-026972 or the like can be referred to. Sometimes the dispersion obtained by the coprecipitation method contains ingredients (e.g., DMSO in which a pigment is dissolved, salts, etc.) whose mixing into such a product as inkjet ink is undesirable, so purification operations may be carried out as appropriate in response to its uses. The purification method is not particularly limited, and ultrafiltration and centrifugal separation, for example, can be employed. When the dispersion liquid of organic fine particles is difficult to prepare in a concentration required for a product, it can be concentrated after the synthesis thereof. The concentration method therefor is not particularly limited, and any of ultrafiltration, centrifugal separation, reduced-pressure concentration (evaporator) and the like can be employed.

The organic fine particles used in the production method of the present invention are preferably formed with an organic compound that holds promise of manifesting size effect when it is fined down. Such an organic compound has no particular restrictions, and when examples of such an organic compound are classified by application, they include functional organic dye compounds (such as organic pigments, sensitizing dyes, photoelectric conversion dyes, optical recording dyes, image recording dyes and coloring dyes), organic electronic materials (such as charge transporting agents and nonlinear optical materials) and medical-related compounds (such as medicines, agricultural chemicals, analytical reagents, diagnostic products and dietary supplements). Of these compounds, charge transporting agents, organic pigments, optical recording dyes, image recording dyes and coloring dyes are preferable to the others, and organic dye compounds including optical recording dyes, image recording dyes, coloring dyes and the like are far preferred. When classification is made by structure, those compounds are not limited to single molecules, but they may be oligomers or polymers containing repeating units combined by the same or different molecular bindings in their respective molecular structures. In addition, they may be hybrid organic-inorganic or organic-metallic compounds.

Further, the fine particles obtained by the production method of the present invention are uniform in size. So, it becomes feasible to increase their solubility in solvents, lower the dissolution temperature thereof and shorten the time required for their dissolution. As a result, a desirable effect of preventing thermal decomposition of the organic compound from occurring in the dissolution process can be produced.

Hereinafter, specific examples of the charge transporting agent usable in the production method of the present invention will be described. However, the present invention is not limited thereto.

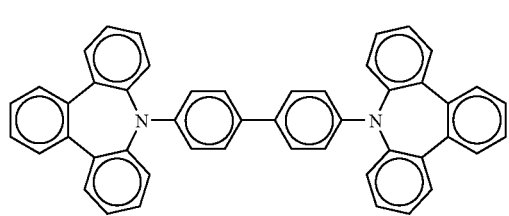
(I-1)

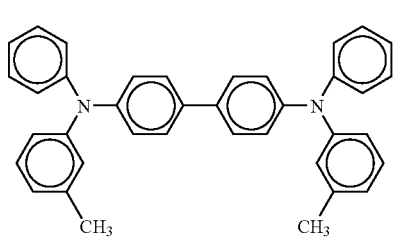
(I-2)

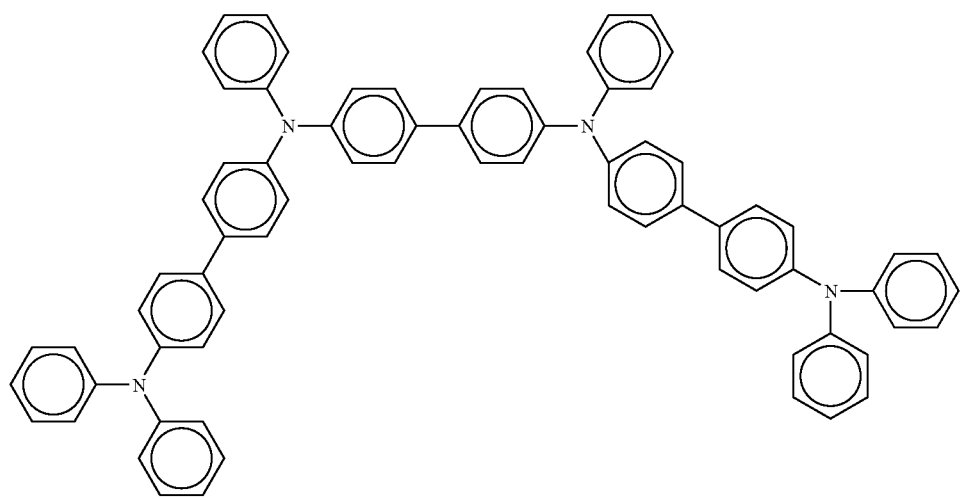
(I-3)

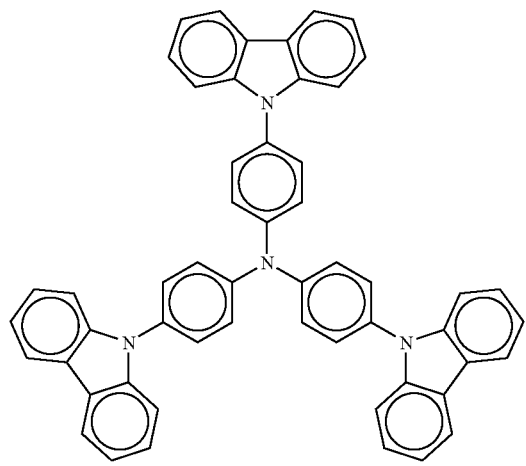
(I-4)

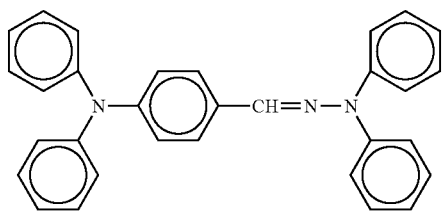
(I-5)

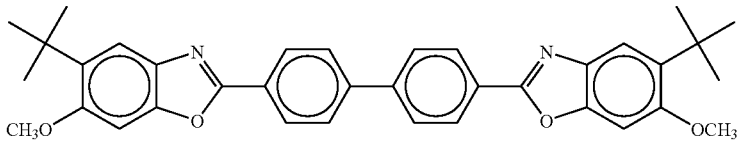

(I-6)

Hereinafter, specific examples of the optical recording dye usable in the production method of the present invention will be described. However, the present invention is not limited thereto.

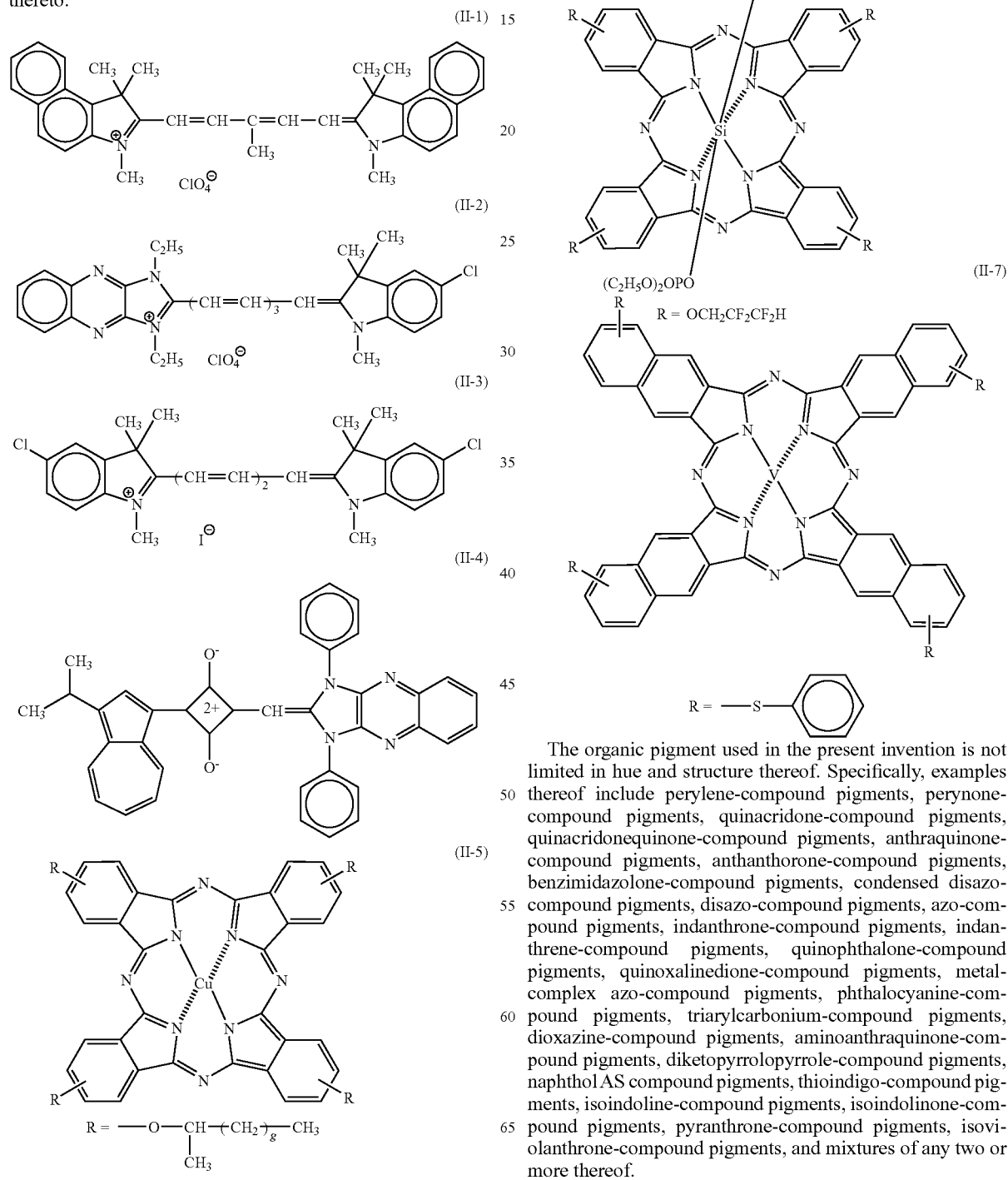

The organic pigment used in the present invention is not limited in hue and structure thereof. Specifically, examples thereof include perylene-compound pigments, perynone-compound pigments, quinacridone-compound pigments, quinacridonequinone-compound pigments, anthraquinone-compound pigments, anthanthorone-compound pigments, benzimidazolone-compound pigments, condensed disazo-compound pigments, disazo-compound pigments, azo-compound pigments, indanthrone-compound pigments, indanthrene-compound pigments, quinophthalone-compound pigments, quinoxalinedione-compound pigments, metal-complex azo-compound pigments, phthalocyanine-compound pigments, triarylcarbonium-compound pigments, dioxazine-compound pigments, aminoanthraquinone-compound pigments, diketopyrrolopyrrole-compound pigments, naphthol AS compound pigments, thioindigo-compound pigments, isoindoline-compound pigments, isoindolinone-compound pigments, pyranthrone-compound pigments, isoviolanthrone-compound pigments, and mixtures of any two or more thereof.

More specifically, examples of the organic pigment include perylene-compound pigments, such as C.I. Pigment Red 179, C.I. Pigment Red 190, C.I. Pigment Red 224, C.I. Pigment Violet 29, or the like; perynone-compound pigments, such as C.I. Pigment Orange 43, C.I. Pigment Red 194 or the like; quinacridone-compound pigments, such as C.I. Pigment Violet 19, C.I. Pigment Violet 42, C.I. Pigment Red 122, C.I. Pigment Red 192, C.I. Pigment Red 202, C.I. Pigment Red 207, C.I. Pigment Red 209 or the like; quinacridonequinone-compound pigments, such as C.I. Pigment Red 206, C.I. Pigment Orange 48, C.I. Pigment Orange 49, or the like; anthraquinone-compound pigments, such as C.I. Pigment Yellow 147 or the like; anthanthrone-compound pigments, such as C.I. Pigment Red 168 or the like; benzimidazolone-compound pigments, such as C.I. Pigment Brown 25, C.I. Pigment Violet 32, C.I. Pigment Yellow 180, C.I. Pigment Yellow 181, C.I. Pigment Orange 36, C.I. Pigment Orange 62, C.I. Pigment Red 185, or the like; condensed disazo-compound pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144, C.I. Pigment Red 166, C.I. Pigment Red 219, C.I. Pigment Red 220, C.I. Pigment Red 221, C.I. Pigment Red 242, C.I. Pigment Red 248, C.I. Pigment Red 262, C.I. Pigment Brown 23, or the like; disazo-compound pigments, such as C.I. Pigment Yellow 13, C.I. Pigment Yellow 83, C.I. Pigment Yellow 188, or the like; azo-compound pigments, such as C.I. Pigment Red 187, C.I. Pigment Red 170, C.I. Pigment Yellow 74, C.I. Pigment Red 48, C.I. Pigment Red 53, C.I. Pigment Orange 64, C.I. Pigment Red 247, or the like; indanthrone-compound pigments, such as C.I. Pigment Blue 60, or the like; indanthrene-compound pigments, such as C.I. Pigment Blue 60, or the like; quinophthalone-compound pigments, such as C.I. Pigment Yellow 138, or the like; quinoxalinedione-compound pigments, such as C.I. Pigment Yellow 213, or the like; metal-complex azo-compound pigments, such as C.I. Pigment Yellow 129, C.I. Pigment Yellow 150, or the like; phthalocyanine-compound pigments, such as C.I. Pigment Green 7, C.I. Pigment Green 36, Pigment Green 37, Pigment Blue 16, C.I. Pigment Blue 75, 15 (including 15:1, 15:6 or the like), or the like; triaryl carbonium-compound pigments, such as C.I. Pigment Blue 56, C.I. Pigment Blue 61, or the like; dioxazine-compound pigments, such as C.I. Pigment Violet 23, C.I. Pigment Violet 37, or the like; aminoanthraquinone-compound pigments, such as C.I. Pigment Red 177, or the like; diketopyrrolopyrrole-compound pigments, such as C.I. Pigment Red 254, C.I. Pigment Red 255, C.I. Pigment Red 264, C.I. Pigment Red 272, C.I. Pigment Orange 71, C.I. Pigment Orange 73, or the like; naphthol AS compound pigments, such as C.I. Pigment Red 187, C.I. Pigment Red 170, or the like; thioindigo-compound pigments, such as C.I. Pigment Red 88, or the like; isoindoline-compound pigments, such as C.I. Pigment Yellow 139, C.I. Pigment Orange 66, or the like; isoindolinone-compound pigments, such as C.I. Pigment Yellow 109, C.I. Pigment Yellow 110, C.I. Pigment Orange 61, or the like; pyranthrone-compound pigments, such as C.I. Pigment Orange 40, C.I. Pigment Red 216, or the like; or isoviolanthrone-compound pigments, such as C.I. Pigment Violet 31, or the like.

Among these, anthraquinone-compound pigments, naphthol compound pigments, perylene-compound pigments, quinacridone-compound pigments, diketopyrrolopyrrole-compound pigments, benzimidazolone-compound pigments, metal-complex azo-compound pigments, dioxazine-compound pigments, naphtholone-compound pigments, phthalocyanine-compound pigments, or indanthrone-compound pigments are preferable.

Examples of an organic dye compound usable for coloring purpose in the production method of the present invention include hydrophobic dyes, and more specifically, reactive dyes, azoic dyes, fluorescent dyes, disperse dyes, styrene dyes, acidic dyes, metal-containing dyes, acidic mordant dyes, direct dyes, cationic dyes, basic dyes, sulfide dyes and oil-soluble dyes.

Hereinafter, specific examples of the coloring dye usable in the production method of the present invention will be described. However, the present invention is not limited thereto.

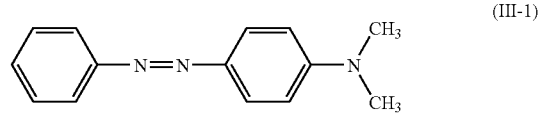

(III-1)

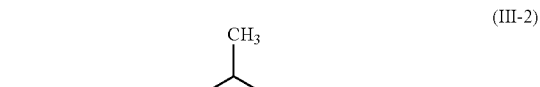

(III-2)

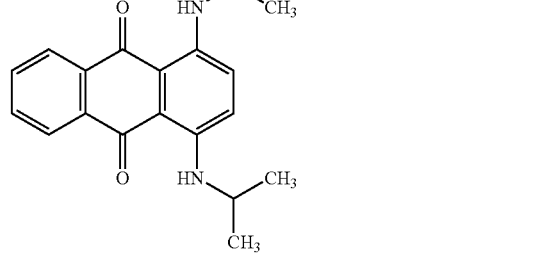

(III-3)

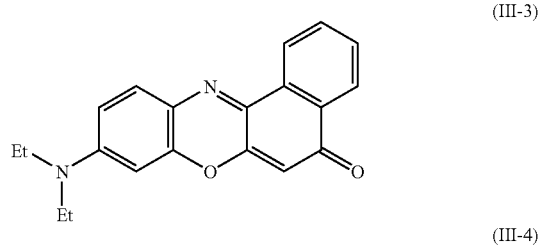

(III-4)

When the organic fine particles are organic pigment fine particles in the present invention, two or more kinds of organic pigments, a solid solution of organic pigments, or a combination of an organic pigment and an inorganic pigment may be used. When the organic fine particles are not organic pigment fine particles, two or more kinds of organic compounds, or an organic compound and an inorganic compound may be used in combination. The organic compound concentration in an organic compound solution used in a reprecipitation or coprecipitation method is not particularly limited, but preferably adjusted to fall within a range of 0.5 to 20 mass %, more preferably adjusted to fall within a range of 1.0 to 10 mass %.

In the production method of the present invention, it is preferred that organic fine particles be formed by adding a dispersing agent to an organic compound solution and/or a precipitation solvent, and then mixing both. The dispersing agent has a function (1) that the dispersing agent is rapidly adsorbed on the surface of the formed pigment, to form fine pigment particles, and (2) that these particles are prevented from aggregating again.

The organic fine particle dispersion liquid to be heated in the production method of the present invention contains a high molecular compound, and by letting the high molecular compound be present at the time of precipitation of particles (namely, adding in advance the high molecular compound to an organic compound solution and/or an aqueous medium), it is feasible to allow the high molecular compound to perform a function as a dispersing agent in the coprecipitation method. Alternatively, it is practicable to adopt a method of carrying out precipitation of particles in the presence of only a low molecular dispersing agent and thereafter adding a high molecular compound, or a method of making both a high molecular compound and a low molecular dispersion agent be present at the time of precipitation of particles. When a high molecular compound is added after precipitation of particles, the addition method can be chosen as appropriate, and more specifically, the high molecular compound may be added as it is, or in a state of being dissolved in an organic solvent.

As the lower molecular dispersing agent, an anionic, cationic, amphoteric, nonionic or pigment-type dispersing agent can be used. These dispersing agents can be used alone or as combinations of two or more thereof. Dispersing agents to be used in dispersion of the pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in JP-A-3-273067 are preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

In the production method of the present invention, it is also practicable to incorporate a polymerizable compound into an organic fine particle dispersion liquid, and subject the compound to polymerization reaction during, before or after the process of heating treatment, whereby the compound is converted into a polymer. This polymer may be used as the high molecular compound in the organic fine particle dispersion liquid to undergo the heating treatment in the present invention. The polymerization method used therein is not particularly limited, and can be chosen from radical polymerization, condensation polymerization, cationic polymerization, anionic polymerization or the like as appropriate. However, radical polymerization using a polymerization initiator is preferred over the others. When radical polymerization is adopted, the means by which polymerization reaction is initiated is not particularly limited, but it is preferred that the polymerization be initiated by heating.

As a radical polymerizable compound suitable as the polymerizable compound, both water-soluble and water-insoluble polymerizable compounds are usable, and those having C=C bonds are preferred. Examples of such polymerizable compounds include (meth)acrylic acid esters (such as methyl acrylate, ethyl acrylate, butyl acrylate and benzyl acrylate), styrenes (such as styrene and o-methylstyrene), vinyl esters (such as vinyl acetate and vinyl propionate), N-vinylamides (such as N-vinylpyrrolidone), (meth)acrylic acid amides, vinyl ethers (such as vinyl methyl ether, vinyl isobutyl ether and vinyl phenyl ether), and (meth)acrylonitrile.

Further, a water-soluble monomer having an anionic group such as a sulfonic group, a phosphoric group, or a carboxylic group is also used. An example thereof includes: a monomer having a carboxyl group such as acrylic acid, methacrylic acid, maleic acid, fumaric acid, itaconic acid, or p-vinyl benzoic acid; or an alkali metal salt, an alkaline earth metal salt, an ammonium salt, an amine salt or the like of the monomer. In addition, specific examples thereof include: styrene sulfonic acid, sodium styrene sulfonate, 2-acrylamide-2-methylpropane sulfonic acid, 2-hydroxy methyl methacryloyl phosphate, 2-hydroxy ethyl methacryloyl phosphate, and 3-chloro-2-hydroxy propyl methacryloyl phosphate. The monomers may be used alone or in combination.

The compounds preferred as polymerizable compounds usable in the present invention are (meth)acrylic acid esters, styrenes, vinyl ethers and N-vinylamides. Among them, N-vinylpyrrolidone is especially preferred.

The polymerizable compound used in the present invention may be a compound having two or more polymerizable groups per molecule. Examples of such a compound include divinylbenzene, ethylene glycol diacrylate, diallyl ether and divinyl ether.

In order to further improve the uniform dispersibility and temporal stability (storage stability) of organic fine particles, the content of a polymerizable compound is preferably from 0.1 to 1,000 parts by mass, more preferably from 1 to 500 parts by mass, particularly preferably from 10 to 250 parts by mass, per 100 parts by mass of the organic compound. When the content is too low, there may be cases where the dispersion stability of organic fine particles after the polymer treatment shows no improvement. When a dispersing agent is incorporated in addition to the polymerizable compound, the content of the dispersing agent is preferably adjusted so that the total content of them is within the range specified above.

The polymerization initiator to be used, though not particularly limited so long as it can polymerize the polymerizable compound used, is preferably a water-soluble or oil-soluble azo polymerization initiator, a macromolecular azo polymerization initiator, an inorganic salt represented by a persulfate, or a peroxide. Of these initiators, a water-soluble azo polymerization initiator, a macromolecular azo polymerization initiator and an inorganic salt are more preferred, an inorganic salt and a macromolecular azo polymerization initiator are still more preferred, and a macromolecular azo polymerization initiator is especially preferred. Examples of an inorganic salt include ammonium persulfate, potassium persulfate and sodium persulfate, examples of a peroxide include hydrogen peroxide, t-butyl hydroperoxide and benzoyl peroxide (BPO), examples of an oil-soluble azo polymerization initiator include 2,2'-azobisisobutyronitrile (AIBN), 2,2'-azobis(4-methoxy-2,4-dimethylvaleronitrile), 2,2'-azobis(2,4-dimethylvaleronitrile) (V-70, trade name, a product of Wako Pure Chemical Industries, Ltd.), dimethyl 2,2'-azobis(2-methylpropionate) (V-65, trade name, a product of Wako Pure Chemical Industries, Ltd.), 2,2'-azobis(2-methylbutyronitrile) (V-601, trade name, a product of Wako Pure Chemical Industries, Ltd.), 1,1'-azobis(cyclohexane-1-carbonitrile) (V-59, trade name, a product of Wako Pure Chemical Industries, Ltd.), 2,2'-azobis[N-(2-propenyl)-2-methylpropionamide] (V-40, trade name, a product of Wako Pure Chemical Industries, Ltd.), 1-[(cyano-1-methylethyl)azo]formamide (VF-096, trade name, a product of Wako Pure Chemical Industries, Ltd.), 2,2'-azobis(N-butyl-2-methylpropionamide) (V-30, trade name, a product of Wako Pure Chemical Industries, Ltd.), 2,2'-azo(N-cyclohexyl-2-methylpropionamide) (VAm-110, trade name, a product of Wako Pure Chemical Industries, Ltd.) and VAm-111 (trade name, a product of Wako Pure Chemical Industries, Ltd.), examples of a water-soluble azo polymerization initiator include 2,2'-azobis[2-(2-imidazoline-2-yl)propane]dihydrochloride, 2,2'-azobis[2-(2-imidazoline-2-yl)propane]disulfate dihydrate (VA-044, trade name, a product of Wako Pure Chemical Industries, Ltd.), 2,2'-azobis(2-methylpropionamidine)dihydrochloride (VA-046B, trade name, a product of Wako Pure Chemical Industries, Ltd.), 2,2'-azobis[N-(2-caroxyethyl)-2-methylpropionamidine]tetrahydrate (V-50, trade name, a product of Wako Pure Chemical Industries, Ltd.), 2,2'-azobis{2-[1-(2-hydroxyethyl)-2-imidazoline-2-yl]propane}dihydrochloride (VA-057, trade name, a product of Wako Pure Chemical Industries, Ltd.), 2,2'-azobis[2-(2-imidazoline-2-yl)propane] (VA-060, trade name, a product of Wako Pure Chemical Industries, Ltd.), 2,2'-azobis(1-imino-1-pyrrolidino-2-ethylpropane)dihydrochloride (VA-061, trade name, a product of Wako Pure Chemical Industries, Ltd.), 2,2'-azobis{2-methyl-N-[1,1-bis(hydroxymethyl)-2-hydroxyethyl]propionamide} (VA-067, trade name, a product of Wako Pure Chemical Industries, Ltd.), 2,2'-azobis[2-methyl-N-(2-hydroxyethyl)propionamide] (VA-080, trade name, a product of Wako Pure Chemical Industries, Ltd.), VA-086 (trade name, a product of Wako Pure Chemical Industries, Ltd.), 2,2'-azobis(2-amidinopropane)dihydrochloride, 2,2'-azobis(2-N-benzylamidinopropane)dihydrochloride and 2,2'-azobis[2-N-(2-hydroxyethyl)amidinopropane]dihydrochloride, and examples of a macromolecular azo polymerization initiator include polydimethylsiloxane unit-containing macromolecular azo polymerization initiators, such as VPS-0501 (polysiloxane unit molecular weight: about 5,000) and VPS-1001 (polysiloxane unit molecular weight: about 10,000), trade names, products of Wako Pure Chemical Industries, Ltd.; and polyethylene glycol unit-containing macromolecular azo polymerization initiators, such as VPE-0201 (polyethylene glycol unit molecular weight: about 2,000), VPE-0401 (polyethylene glycol unit molecular weight: about 4,000) and VPE-0601 (polyethylene glycol unit molecular weight: about 6,000), trade names, products of Wako Pure Chemical Industries, Ltd. Various kinds of water-soluble azo polymerization initiators, oil-soluble azo polymerization initiators and macromolecular azo polymerization initiators are described, e.g., in the home page of Wako Pure Chemical Industries, Ltd. (www.wako-com.co.jp) together with their individual structures and 10 hour half-life decomposition temperatures, and available from Wako. The amount of a polymerization initiator used is not particular limited, but preferably from 0.1 to 30 mass %, more preferably from 1 to 20 mass %, particularly preferably from 2 to 10 mass %, with respect to the total monomer component.

By using a surfactant having a polymerizable group on the occasion when coprecipitation is carried out, the surfactant can deriver both a function of controlling particle sizes at the time of precipitation of particles and a function as a polymerizable compound which becomes a raw material of polymer for retention of dispersion stability, and can be favorably used in the present method for producing an organic fine particle dispersion liquid. Examples of such a surfactant include compounds each having both an α,β-ethylenic unsaturated group, such as a vinyl group, an allyl group, a propenyl group or a (meth)acryloyl group, and a group capable of causing ionic dissociation, such as a sulfonic group or its salt, or a hydrophilic group such as an alkyleneoxy group. These compounds are generally used for emulsion polymerization, and they are anionic or nonionic surfactants having at least one radical-polymerizable unsaturated bond per molecule.

As the polymerizable compound in the present method for producing an organic fine particle dispersion, such polymerizable surfactants may be used alone, or as combinations of different ones, or in combination with polymerizable compounds other than themselves. Examples of a polymerizable surfactant preferably used in the present invention include various kinds of polymerizable surfactants available from Kao Corporation, Sanyo Chemical Industies, Ltd., DAI-ICHI KOGYO SEIYAKU CO., LTD., ADEKA CORPORATION, Nippon Nyukazai Co., Ltd., NOF CORPORATION, and the like, and more specifically, those recited in *Biryushi Funtai no Saisentan Gijutsu* (which might be literally translated "Leading-edge Technology of Fine Particles and Powder"), Chap. 1-3 entitled "Hanno Nyukazai wo Mochiiru Biryushi Sekkei" (which might be literally translated "Fine-Particle Design Using Reactive Emulsifier"), pp. 23-31, CMC Publishing Co., Ltd. (2000), and the like.

Hereinafter, specific examples of the polymerizable surfactant usable in the production method of the present invention will be described. However, the present invention is not limited thereto.

[Compound 1] ADEKA REASOAP SE-ION, manufactured by ADEKA CORPORATION n = 10

[Compound 2] ADEKA REASOAP SR-10, manufactured by ADEKA CORPORATION n = 10

[Compound 3] ADEKA REASOAP NE-40, manufactured by ADEKA CORPORATION n = 40

[Compound 4] AQUALON HS-40, manufactured by DAI-ICHI KOGYO SEIYAKU CO, LTD.

n = 40

[Compound 5] AQUALON KH-10, manufactured by DAI-ICHI KOGYO SEIYAKU CO., LTD.

n = 9 or 11
m = 10

[Compound 6] LATEMUL, S-180A, manufactured by Kao Corporation

R: $C_{12}H_{25}$ or $C_{18}H_{36}F$
M: $NH_4$

[Compound 7] ELEMINOL JS-2, manufactured by Sanyo Chemical Industries, Ltd.

R: $C_{12}H_{25}$ or the like

[Compound 8] Antox MS-60, manufactured by Nippon Nyukazai Co. Ltd.

R: hydrogen, an alkyl group, a benzyl group or a styrene group
X: an alkali metal, an alkaline earth metal, an ammonium cation or amine cation
m: an integer of 1 or more
n: an integer of 1 or more The suitable content of the polymerizable surfactant as recited above is in the same range as described above as that of the polymerizable compound.

In the production method of the present invention, it is preferable that the high molecular compound contained in the organic fine particle dispersion liquid is subjected to crosslinking reaction by itself or with the aid of a compound having a cross-linkable functional group (sometimes referred to as a low molecular compound in order to distinguish it from the high molecular compound) and thereby converted into a cross-linked high molecular compound. The term "crosslinking reaction" as used herein means that a cross-linkable functional group-containing low molecular compound and/or a high molecular compound enters into intermolecular combinations making covalent bonds, thereby forming a three-dimensional network structure. Great many studies have been made on cross-linkage and decomposition of polymers, cross-linking agents and cross-link structures, and details thereof are described, e.g., in *Kobunshi no Kakyo to Bunkai-Kankyo Hozen wo Mezashite*—(which might be literally translated "Cross-linkage and Decomposition of Polymers—With a View toward Preserving the Environment—), CMC Publishing Co., Ltd. (2004).

Cross-linking reactions are broadly classified into those caused by heat, those caused by light, those caused by electron beams, and the like. In the present invention, these reactions may be employed in combination. When they are employed singly, cross-linking reactions caused by heat are preferable to the others. Further, the cross-linking reactions may be accelerated by addition of catalysts or irradiation with microwaves. The cross-linking reaction in the present invention may be carried out in combination with radical polymerization reaction. In this case, the order in which these reaction processes are performed does not matter, and they may be carried out simultaneously. When the radical polymerization is initiated by heat in particular, these reactions can be performed very smoothly. When the low molecular compound and the high molecular compound are present together, cross-linkable functional groups may be contained in either of them. However, compounds containing two or more cross-linkable functional groups per molecule are preferred.

The addition amount of the compound having cross-linkable functional groups is not particularly limited, but preferably in a range of 0.1 to 1,000 parts by mass, more preferably in a range of 1 to 500 parts by mass, particularly preferably in a range of 10 to 250 parts by mass, with respect to 100 parts by mass of the organic compound in organic fine particles.

Cross-linkable functional groups for use in the present invention may also be those causing self-crosslinking reaction, and compounds each having both cross-linkable functional groups and a structure of cross-linking agent in one molecule are preferred. Further, the cross-linkable functional groups may be one and the same kind, or two or more different kinds of cross-linkable functional groups may be present together.

Compounds having cross-linkable functional groups (low molecular compound/high molecular compound) may be incorporated into a solution of the organic compound used for preparation of an organic fine particle dispersion liquid, or may be added to an organic fine particle dispersion liquid after formation of organic fine particles. However, the former case is preferable to the latter case. In addition, the cross-linking reaction may be carried out simultaneously with coprecipitation, or after the preparation of an organic fine particle dispersion liquid. And it is particularly preferable that thermal cross-linking reaction is carried out by heating an organic fine particle dispersion liquid inside a channel. Although a reason for this remains uncertain, adsorptivity of compounds having cross-linkable functional groups to fine particles is enhanced by heating treatment inside a channel, and greater-than-expected improvement in stability can be achieved.

Examples of a resin produced by combining compounds having functional groups capable of causing cross-linking reaction under heating include phenol resin produced from the combination of phenol and formaldehyde, amino resin produced from urea, melamine and formaldehyde by addition condensation, epoxy resin produced by reacting epoxide with amine, a Lewis acid, carboxylic acid, carboxylic anhydride, isocyanate, polymercaptan, polyphenol such as novolak, dicyandiamide and/or the like, unsaturated polyester resin produced by polycondensation reaction between maleic anhydride and ethylene glycols, cross-linked-and-cured unsaturated polyester resin produced by mixing a vinyl monomer, such as styrene or methyl methacrylate, with unsaturated polyester resin and making them undergo radical polymerization, and silicone resin produced by hydrolysis of chlorosilane or alkoxysilane and subsequent dehydration-condensing reaction.

Concrete reaction for thermal cross-linking in the present invention is preferably cross-linking reaction caused by a combination of any of an aldehydo group, an epoxy group and a carboxylic anhydride structure with a hydroxyl group or an amino group. And the reaction caused by the combination of an aldehydo group and a hydroxyl group, that of an aldehydo group and an amino group, that of a carboxylic anhydride structure and a hydroxyl group, or that of a carboxylic anhydride structure and an amino group is more preferably employed for the thermal cross-linking. In particular, the reaction caused by the combination of an aldehydo group and a hydroxyl group or that of a carboxylic anhydride structure and a hydroxyl group is used to advantage over the others.

In the present invention, it is preferred that the number of thermally cross-linkable functional groups present in one molecule be two or more. In addition, the molecule may be an oligomer or polymer having repeating units of the same structure. Further, two or more different kinds of functional groups as recited above may be present in one and the same molecule, irrespective of whether or not cross-linking reaction occurs between them.

Furthermore, compounds having those thermally cross-linkable functional groups may contain in each individual molecule various kinds of functional groups having no reactivity to thermal cross-linking reaction. Examples of these functional groups include halogen, an ether group, an ester group, an amido group, a carboxylic acid structure, a carbon-carbon double bond, a carbon-carbon triple bond and a nitrile group. And two or more of them may be contained in one molecule irrespective of whether they are same or different in kind.

Examples of those which are suitably usable as the foregoing compounds include the following compounds, but the present invention should not be construed as being limited thereto.

Examples of a compound having an aldehydo group include formaldehyde, acetaldehyde, propionaldehyde, isobutyraldehyde, butyraldehyde, valeraldehyde, hexanal, 2-ethylhexanal, octanal, nonanal, decanal, acrolein, mathacrolein, crotonaldehyde, citronellal, trans-2-octenal, 2,4-hexadienal, cyclohexane carboxaldehyde, 5-norbornene-2-carboxaldehyde, 3-ethoxymethacrolein, glyoxal, glitaric dialdehyde, phenylacetaldehyde, hydrocinnamaldehyde, trans-cinnamaldehyde, 4-stilbenecarboxaldehyde, penillglyoxal, benzaldehyde, tetraphenylcarboxaldehyde, terephthaldicarboxaldehyde, 4-biphenylcarboxaldehyde, 2-naphthaldehyde, and 2,3-naphthalenedicarboxaldehyde.

Examples of a compound having an epoxy group include 1,2-epoxyhexane, 1,2-epoxyoctadecane, 1,2-epoxy-5-hexene, glycidol, allyl glycidyl ether, 1,2,7,8-diepoxyoctane, cyclopentene oxide, cyclohexane oxide, 1,2,5,6-diepoxycyclooctane, styrene oxide, 2,3-epoxypropylbenzene, stilbene oxide, and 2-biphenyl glycidyl ether.

Examples of a compound having a carboxylic anhydride structure include hexanoic anhydride, crotonic anhydride, methacrylic anhydride, oleic anhydride, succinic anhydride, cyclohexanedicarboxylic anhydride, itaconic anhydride, norbornenedicarboxylic anhydride, diacetyltartaric anhydride, maleic anhydride, glutaric anhydride, diglycolic anhydride, 2,3-diphenylmaleic anhydride, homophthalic anhydride, 1,2,4,5-benzenetetracarboxylic dianhydride, 1,8-naphthalic anhydride, 1,4,5,8-naphthalenetetracarboxylic dianhydride, and 3,4,9,10-perylenetetracarboxylic dianhydride.

Examples of a compound having a hydroxyl group include 1-nonanol, 1-octadecanol, 2-octanol, 2-hexadecanol, 2-methyl-2-hexanol, ethylene glycol, 1,4-butanediol, 2,3-butanediol, pinacol, 1,5-pentanediol, 1,2-pentanediol, 1,10-decanediol, 2,5-hexanediol, 2,5-dimethyl-2,5-hexanediol, allyl alcohol, 2-methyl-3-butene-1-ol, 4-hexene-1-ol, β-citronellol, 2-butene-1,4-diol, 1,6-heptadiene-4-ol, famesol, 1,2-cyclohexanediol, 1,4-cyclohexanediol, 1,4-cyclohexanedimethanol, norborneol, 1,5-decanediol, 1-adamantanemethanol, 3,5-cyclohexadiene-1,2-diol, glycerol, pentaerythritol, D-glucose, sucrose, phenol, 3,3-(ethylenedioxy)diphenol, catechol, pyrogallol, phloroglucinol, resorcinol, hydroquinone, 2-naphthol, 1,1'-bi-2-naphthol, 1,5-dihydroxynaphthalene, 2,3-dihydroxynaphthalene, 4,4'-biphenol, bis(4-hydroxyphenyl)methane, benzyl alcohol, benzopinacol, 1,4-benzenedimethanol, and 3-phenoxy-1,2-propanediol.

Examples of a compound having an amino group include amylamine, undecylamine, 1,4-diaminopropane, 1,12-diaminododecane, 1,2-diaminocyclohexane, 1,4-diaminocyclohexane, oleylamine, ethanolamine, 4-amino-1-butanol, triethanolamine, 4,4'-trimethylenedipiperidine, 4-hydroxypiperidine, piperazine, aniline, 2-aminophenol, 3-aminothiophenol, 4,4'-ethylenedianiline, 4,4'-methylenedianiline, 4-aminophenol, 3,4-diaminotoluene, 1,2-phenylenediamine, 1,4-phenylenediamine, 1,5-diaminonaphthalene, phenylhydrazine, 1,2-diphenylethylenediamine, 4-aminobenzylamine, and 3,4-dihydroxybenzylamine.

The cross-linking reactions caused by light are broadly divided into five groups, and functional groups specific to their respective types are used.

(i) Cross-linking reaction of the type which is caused directly by light, wherein a cinnamic acid group, a cinnamylidene group, a benzalacetophenone group, a stilbene group and α-phenylmaleimido group are given as examples of the functional group specific to this type and dimerization occurs with efficiency.

(ii) Cross-linking reaction of the type which utilizes a sensitizer as cross-linking agent, wherein a bisazido group is given as an example of the cross-linking agent of this type and highly active nitrene is produced by photolysis of the azido group.

(iii) Cross-linking reaction of the type which utilizes photo-radical generation, wherein groups derived from benzoin alkyl ether, benzylketal, α-hydroxyacetophenone, α-aminoacetophenone and acylphophine oxide are given as examples of the functional group specific to this type and cross-links are formed by reacting them, e.g., with polyfunctional acrylic monomers.

(iv) Cross-linking reaction of the type which utilizes photo-acid generation, wherein ionic groups derived from sulfonium salts and iodonium salts and nonionic groups derived from phenacylsulfone, o-nitrobenzyl ester, iminosulfonate and sulfonic acid ester of N-hydroxyimide are given as examples of the functional group specific to this type and epoxy groups or vinyl ether groups are used as reactive groups.

(v) Cross-linking reaction of the type which utilizes photo-amine generation, wherein groups derived from photo-base generators in particular, such as Co-amine complexes, carboxylic acid esters of oxime, carbamic acid esters and quaternary ammonium salts, are given as examples of the functional group specific to this type and amines generated from these groups can effectively form cross-links between monomers, oligomers or polymers each having two or more functional groups capable of reacting with the amines.

By the way, attention is being given to techniques to synthesize functional compounds by making high molecular compounds undergo cross-linking reaction. From the viewpoint of preserving the environment in particular, application of such techniques to various recycle processes has been tried in recent years (*Kobunshi no Kakyo to Bunkai-Kankyo Hozen wo Mezashite-*, pp. 249-298, CMC Publishing Co., Ltd.). From this social request, application of such techniques captures the spotlight also in enhancement of recycling efficiencies of materials for paint and ink indispensable to our lives now. More specifically, a wide variety of aqueous resins are used for production of paint and ink, and herein the cross-linking technique is also indispensable (*Toryo Ink Secchakuzai no Suiseika Gijutsu* (which might be literally translated "Techniques to Convert Paint, Ink and Adhesive to Aqueous Form"), pp. 3-17, Technical Information Institute Co., Ltd.). So, it is 21 st-century science responsibility not only to promote further technical developments and impart higher functionalities to materials but also to produce ecologically friendly raw materials. Embodiments of the present invention can also meet these requests suitably. More specifically, application of the cross-linking technique to fine particles in a nanometer size range which are very difficult to give dispersion stability because of their great specific surface areas and adoption of a simple process of heating the fine particles inside a channel allow achievement of higher-than-expected stabilization effect. Although a reason for this remains uncertain, the effect is thought to be derived from a manner in which cross-linkable compounds are captured inside particles and firm adsorption of cross-linkable compounds to particle surfaces.

Next, microreactors which can be suitably used in the production method of the present invention are illustrated.

The organic fine particle dispersion liquid for use in the production method of the present invention is preferably produced by means of a microreactor. The equivalent diameter of a microreactor's channel inside which organic fine particles are precipitated is preferably 1 mm or less, more preferably from 0.01 mm to 0.5 mm. When a series of processes for precipitation of organic fine particles and for heating treatment of the dispersion liquid thereof are carried out inside a sequence of contiguous channels, the equivalent diameters of channels for both processes may be different from each other, or may be adjusted to have the same value.

When pigment fine particles are produced, the flow velocity (flow rate) of the fluid which flows in the channel is preferably from 0.1 mL/hour to 300 L/hour, more preferably from 0.2 mL/hour to 30 L/hour, further preferably from 0.5 mL/hour to 15 L/hour, and particularly preferably from 1 mL/hour to 6 L/hour.

As the equivalent diameter of a channel is smaller, the surface area per unit volume (specific surface area) thereof is larger. When the channel turns into a micro-scale, the specific surface area becomes remarkably large so that the conduction efficiency of heat through the wall of the channel becomes very high. Since the heat conduction time (t) of a fluid flowing in the channel is represented by: $t=d_{eq}^2/\alpha$ (in which $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high.

Specifically, a mixing space that has an equivalent diameter of micrometer size and includes a rectifiable channel is provided for a micro-reactor. By feeding two or more liquids into the channel in the same longitudinal direction and passing them through it, the liquids can be brought into contact with one another and mixed together. For details of the micro-reactor, W. Ehrfeld, V. Hessel & H. Loewe, "Microreactor", 1st Ed. (2000) Wiley-VCH, for example, can be referred to.

When a micro-reactor is used, the temperature and reaction time between the solutions therein can be more precisely controlled, different from a conventional batch system, in which, for example, a tank having a large volume is used as a reaction site, and a jet reactor in which liquid droplets are sprayed and made to collide with one another in a current of air (see, for example, U.S. Pat. No. 6,537,364).

Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there is a possibility that the resultant product becomes non-homogeneous or crystals of the product grow beyond necessity in the mixing container (batch) to get coarse. Contrary to the above, according to a micro-reactor solutions hardly remain in the mixing space (e.g. a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it advantageously becomes difficult that crystals aggregate in the mixing space or get coarse.

Speaking of the scale-up, there may be cases where properties of a chemical substance experimentally produced in only a small amount cannot be reproduced so long as a batch system is adopted when the substance is produced in large quantities with large-scale production facilities. Such an inconvenience can be resolved by use of micro-reactors. More specifically, the producing lines which use micro-reactors increased in number (numbering-up) according to the production volume required are arranged in parallel, and thereby it can have advantages that the result obtained by one micro-reactor can be reproduced without any impairment and mass production can be attained with high efficiency and high accuracy.

The micro-reactors may be made by use of a general method and materials. A fluid control method is classified into a continuous flow system and a droplet (liquid plug) system according to the formation, while it is also classified into an electric driving system and a pressure driving system according to the driving force.

In the present invention, it is preferred to employ the continuous flow system. When the flow is controlled in the continuous flow system, the entire portion inside the micro-channel can be preferably filled with a fluid. And, it is preferred to drive the fluid as a whole by a pressure source such as a syringe pump that is provided outside the channel (a pressure driving system). In this method, although dead volume is large, the continuous flow system has such a great merit that the control system can be realized with a relatively simple set-up.

As to producing methods and control methods of micro-reactors, JP-A-2005-307154, paragraphs [0035] to [0046], for example, can be referred to.

In the present invention, the length of a micro-reactor's liquid-mixing space with micro-channels (the length of the channel) is not particularly limited, but it is preferably 1 mm or more but 10 m or less, more preferably 5 mm or more but 10 m or less and particularly preferably 10 mm or more but 5 m or less.

In the present invention, the number of channels may be any number appropriately provided with a reactor. Many channels may be used in parallel (i.e. numbering-up) as needed, to increase a production amount of the pigment fine particle dispersion.

Figure 8:
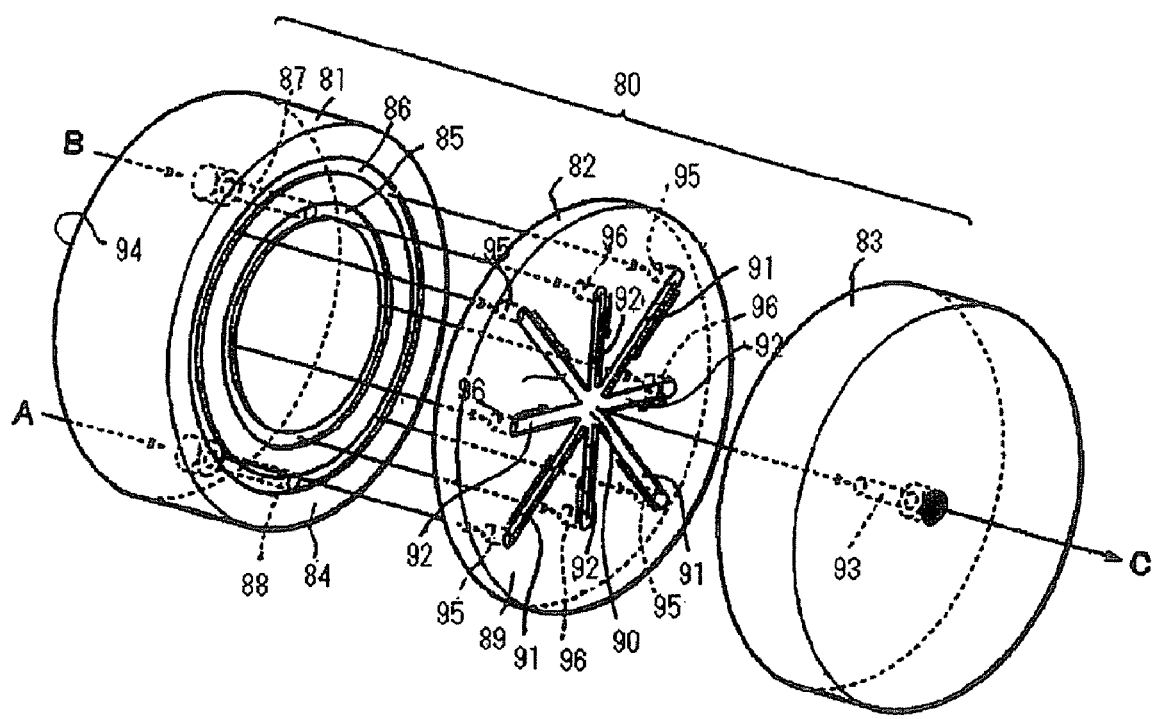
FIG. 8 is an exploded diagrammatic perspective view showing schematically one embodiment of a central-collision microreactor apparatus.

Preferred examples of a reactor that can be used in the method of the present invention are illustrated in FIGS. 1-1 to 8. Needless to say, the present invention is not limited to these examples.

Figures 1, 2:
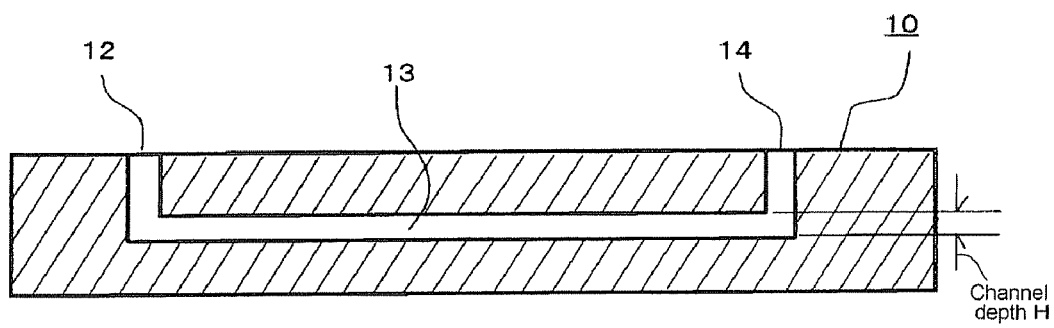

FIG. 1-1 is an explanatory view of one embodiment of a reactor 10 having a Y-shaped channel. FIG. 1-2 is a sectional view taken on I-I line of FIG. 1-1. The shape of the section perpendicular to the direction of the length of the channel is varied dependently on the micro processing technique to be used, and is preferably a shape close to a trapezoid or a rectangle. Further, it is preferable that width C and depth H are made into micrometer-sizes. Solutions introduced from introducing ports 11 and 12 with pumps or the like are caused to flow via introducing channels 13a or 13b, respectively, and are brought into contact with each other at a fluid confluence points 13d to preferably form stable laminar flows to flow through a reaction channel 13c. While the solutions flow as the laminar flows, a solute contained in a laminar flow is mixed or reacted with another solute contained in another laminar flow each other by molecular diffusion on the interface between the laminar flows. Solutes, which diffuse very slowly, may not be diffused or mixed between the laminar flows; and, in some cases, the solites are not mixed until they reach a discharge port 14. In such a case that the two solutions to be introduced are easily mixed in a flask, the flow of the mixed solutions may become homogeneous flow in the discharge port if a channel length F is made long. However, when the channel length F is short, laminar flows are kept up to the discharge port. When the two solutions to be introduced are not mixed in a flask and are separated into phases, the two solutions naturally flow as laminar flows to reach the discharge port 14.

Figures 1, 2:
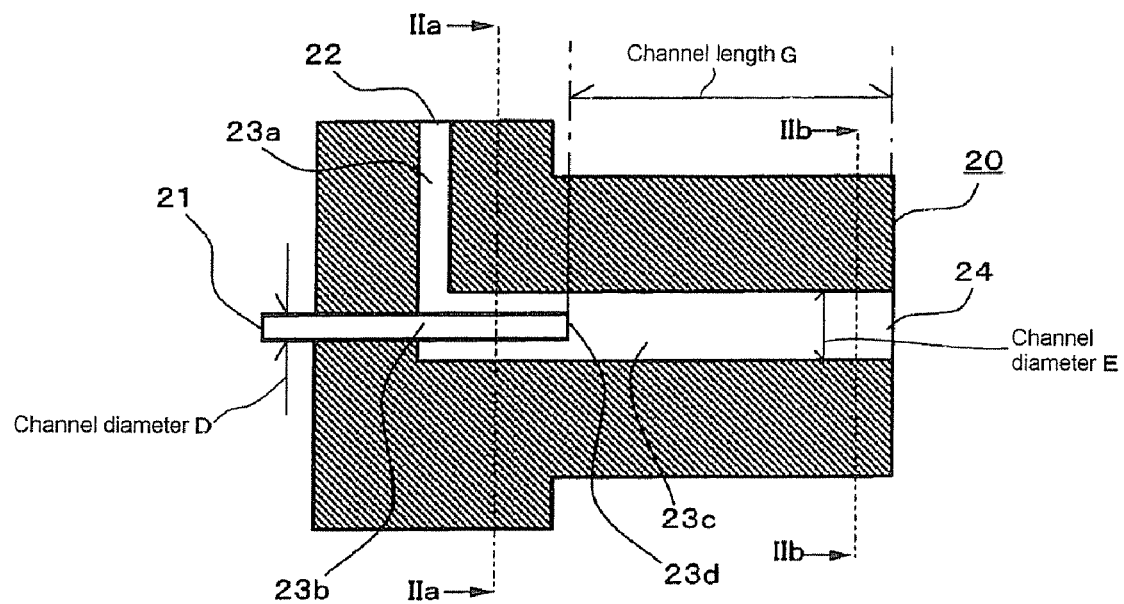
Figure 2:
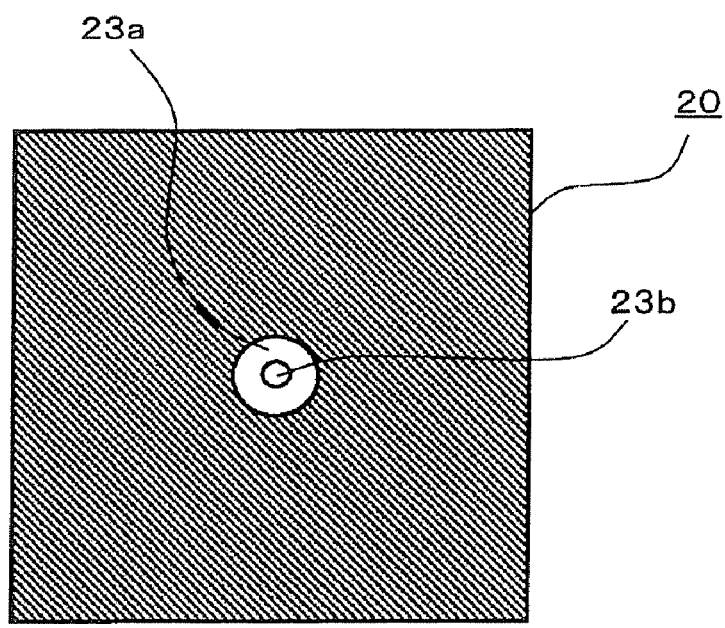
Figures 2, 3:
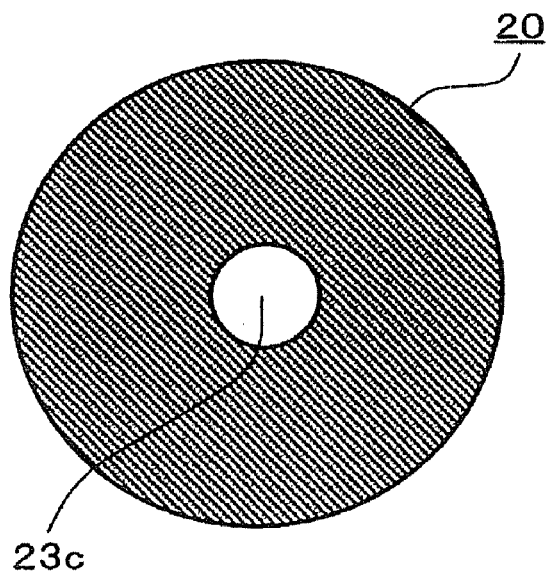
Figures 1, 3:
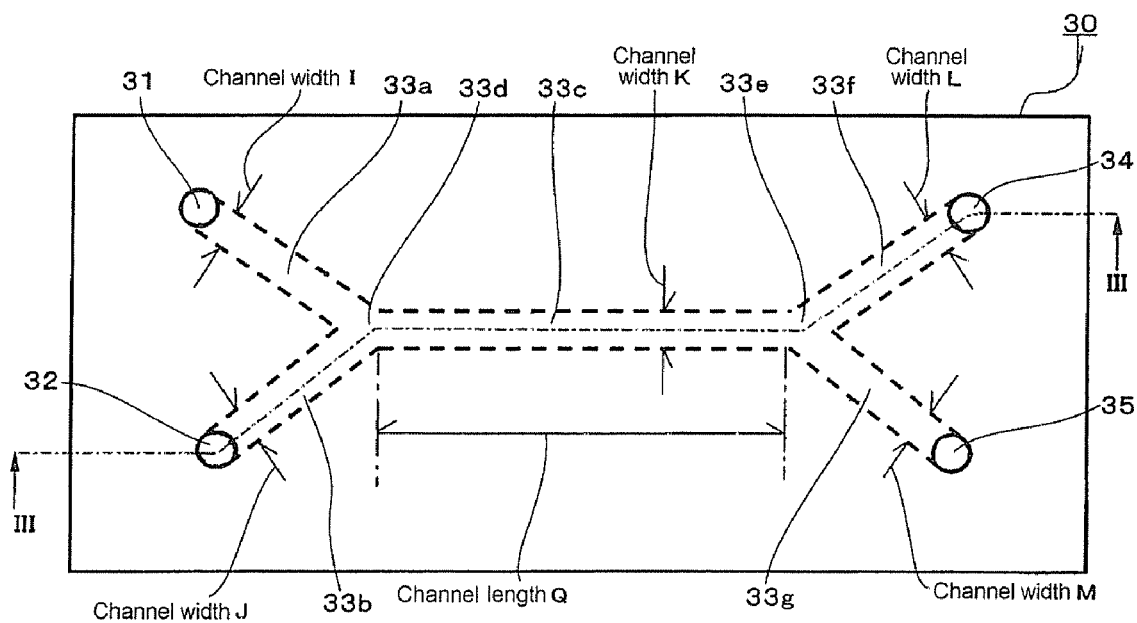
Figures 2, 3:
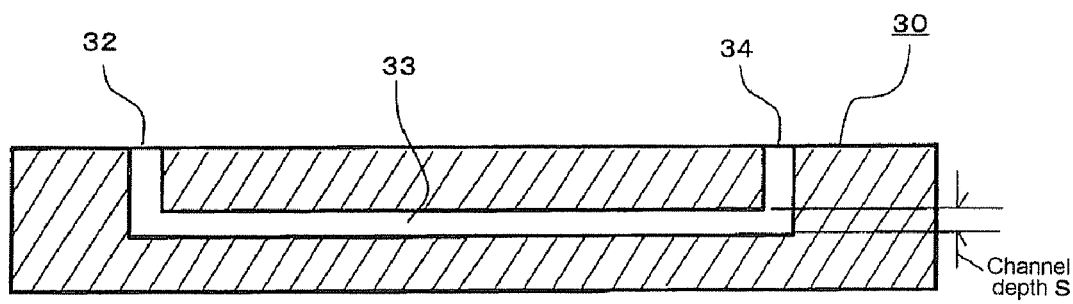

FIG. 2-1 is an explanatory view of one embodiment of a reactor 20 having a cylindrical pipe-type channel in which a channel is inserted at one side thereof. FIG. 2-2 is a sectional view of the reactor taken on line IIa-IIa of FIG. 2-1, and FIG. 2-3 is a sectional view of the reactor taken on line IIb-IIb of FIG. 2-1. The shape of the section perpendicular to the direction of the length of the channel is preferably a circular shape or a shape close thereto. In this case, it is preferable that the channel diameters (D and E) of the cylindrical pipes are micrometer-sizes. Solutions introduced from introducing ports 21 and 22 with pumps or the like are caused to flow via introducing channels 23b or 23a, respectively, and are brought into contact with each other at a fluid confluence point 23d to preferably form stable cylindrical laminar flows to flow through a reaction channel 23c. While the solutions flow as the cylindrical laminar flows, solutes contained in the separate laminar flows are mixed or reacted with each other by molecular diffusion on the interface between the laminar flows. This matter is the same as in the case of the reactor, as illustrated in FIG. 1-1. The apparatus having the cylindrical pipe-type channel has the following characteristics: that the apparatus can make the contact interface between the two solutions larger than the apparatus illustrated in FIG. 1-1; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is clogged.

Figure 4:
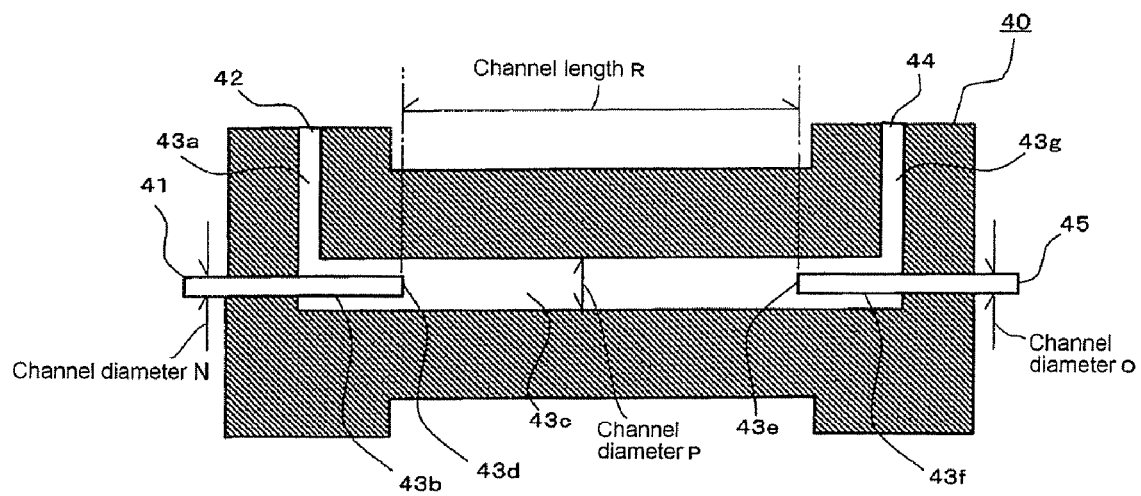
FIG. 4 is an vertical section view of one embodiment of a reactor for use in a method of the present invention, which reactor has a cylindrical tube-type channel in which channels are provided to insert at both sides thereof.

FIGS. 3-1 and 4 illustrate apparatuses obtained by improving the apparatuses illustrated in FIGS. 1-1 and 2-1, respectively, in order that when flows of two solutions arrive at outlets in the state that the flows are laminar flows, the laminar flows can be separated. When these apparatuses are used, reaction and separation can be attained at the same time. It is also possible to avoid phenomena that the two solutions are finally mixed so that the reaction between the solutions advances excessively, and that generated crystals get coarse. In the case that products or crystals are selectively present in one of the solutions, the products or crystals can be obtained with a higher concentration than in the case that the two solutions are mixed. Further, by linking a plurality of the apparatuses to each other, there are such advantages that an extracting operation is effectively performed.

Figure 5:
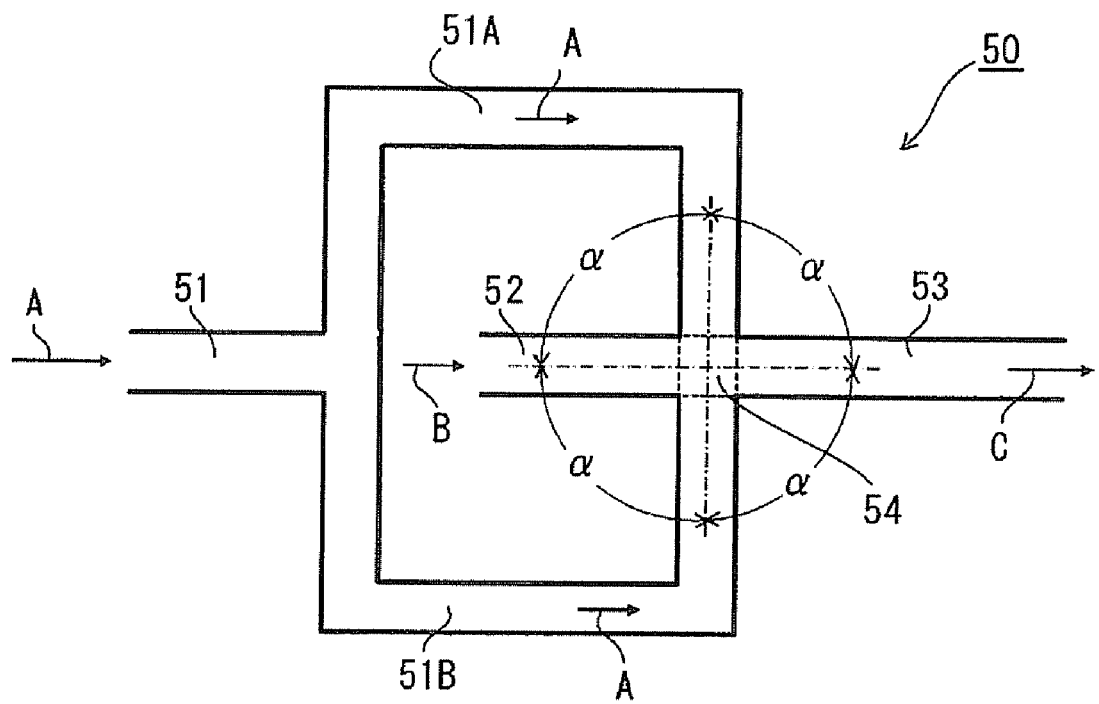
FIG. 5 is a plane cross section view illustrating one embodiment of a plane-type micro-reactor for use in a method of the present invention.

A micro-reactor 50 shown in FIG. 5 is configured in such a manner that two divided supply flow paths 51A, 51B that are divided from one supply flow path 51 for supplying a solution A so as to divide the solution A into two, one supply flow path 52 for supplying a solution B, which is not divided, and a micro-flow path 53 for effecting a reaction between the solutions A and B are communicated with each other in one junction region 54. (In FIGS. 5 to 8, an arrow shows the flow direction of a solution A, B, or C.) Further, the divided supply flow paths 51A, 51B, the supply flow path 52, and the micro-flow path 53 are placed with an equal interval at 90° around the junction region 54 substantially in an identical plane. More specifically, center axes (alternate long and short dash lines) of the respective flow paths 51A, 51B, 52, and 53 cross each other in a cross shape (cross angle $\alpha$=90°) in the junction region 54. In FIG. 5, although only the supply flow path 51 of the solution A is divided so as to allow to make its supply amount to be larger than that of the solution B, the supply flow path 52 of the solution B may also be divided into a plurality of paths. Further, the cross angle $\alpha$ of the respective flow paths 51A, 51B, 52, and 53 placed around the junction region 54 is not limited to 90°, and can be set appropriately. Further, the number of division of the supply flow paths 51, 52 is not particularly limited. However, when the number of division is too large, the configuration of the micro-reactor 50 becomes complicated. Therefore, the number of division is preferably 2 to 10, and more preferably 2 to 5.

Figure 6:
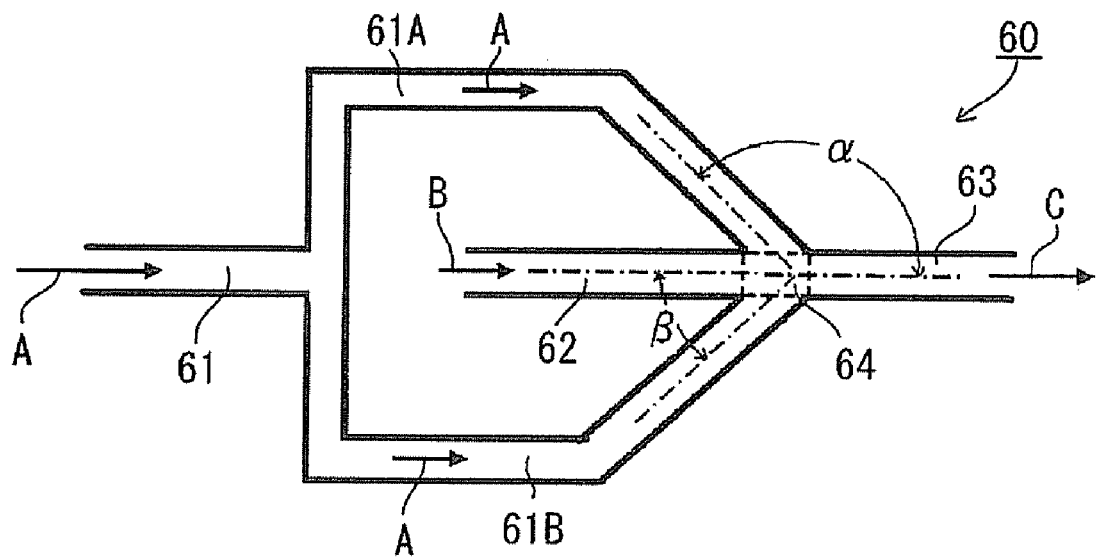
FIG. 6 is a plane cross section view illustrating another embodiment of a plane-type micro-reactor for use in a method of the present invention.

FIG. 6 is an explanatory view illustrating another embodiment of the plane-type microreactor. In a microreactor 60, a cross angle $\beta$ formed by center axes of divided supply flow paths 61A, 61B with respect to a center axis of a supply flow path 62 is smaller than 90° of FIG. 5 and is 45°. Further, the microreactor 60 is configured so that a cross angle $\alpha$ formed by a center axis of a micro-flow path 63 with respect to the center axes of the divided supply flow paths 61A, 61B is 135°.

Figure 7:
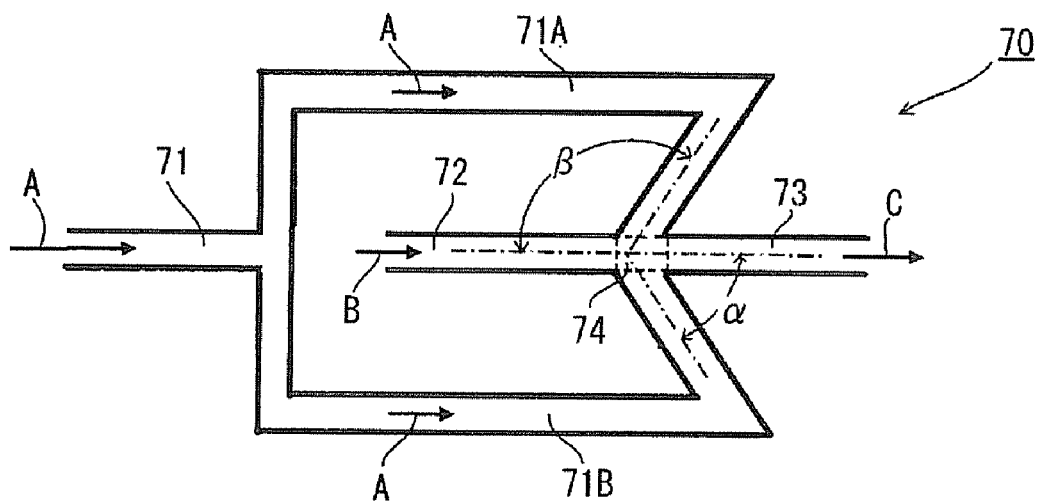
FIG. 7 is a plane cross section view illustrating still another embodiment of a plane-type micro-reactor for use in a method of the present invention.

FIG. 7 is an explanatory view illustrating still another embodiment of the plane-type microreactor. In a microreactor 70, a cross angle $\beta$ formed by center axes of divided supply flow paths 71A, 71B through which the solution A flows with respect to a center axis of the supply flow path 72 through which a solution B flows is larger than 90° of FIG. 5 and is 135°. Further, the microreactor 70 is configured so that a cross angle $\alpha$ formed by a center axis of a micro-flow path 73 with respect to the center axes of the divided supply flow paths 71A, 71B becomes 45°. The cross angles $\alpha$, $\beta$ of the supply flow path 72, the divided supply flow paths 71A, 71B, and the micro-flow path 73 can be set appropriately. However, assuming that the sum of cross-sections in a thickness direction of the joined solutions B and A is S1, and the cross-section in a diameter direction of the micro-flow path 73 is S2, it is preferable to set the cross angles $\alpha$, $\beta$ so as to satisfy S1>S2. This can further increase the contact area between the solutions A, B, and further decrease the diffusion/mixing distance thereof, so that the mixing becomes likely to occur more instantaneously.

FIG. 8 is an exploded perspective view showing an embodiment of a three-dimensional microreactor under the condition that three parts constituting the microreactor 80 are decomposed. The three-dimensional microreactor 80 is mainly composed of a supply block 81, a junction block 82, and a reaction block 83, each having a cylindrical shape. For assembling the microreactor 80, the side faces of the blocks 81, 82, 83 having a cylindrical shape are attached to each other in this order to form a cylinder, and in this state, the respective blocks 81, 82, 83 are fastened integrally with a boltnut, etc.

On a side face 84 of the supply block 81 opposed to the junction block 82, two annular grooves 86, 85 are formed concentrically, and in the assembled state of the microreactor 80, two annular grooves 86, 85 form ring-shaped flow paths through which the solutions B and A flow respectively. Then, through-holes 88, 87 are respectively formed so as to reach the outside annular groove 86 and the inside annular groove 85 from a side face 94 of the supply block 81 not opposed to the junction block 82. Among two through-holes 88, 87, supply means (a pump, a connecting tube, etc.) for supplying the solution A is connected to the through-hole 88 communicated with the outside annular groove 86, and supply means (a pump, a connecting tube, etc.) for supplying the solution B is connected to the through-hole 87 communicated with the inside annular groove 85. In FIG. 8, although the solution A is allowed to flow through the outside annular groove 86, and the solution B is allowed to flow through the inside annular groove 85, they may be opposite.

At a center of a side face 89 of the junction block 82 opposed to the reaction block 83, a circular junction hole 90 is formed, and four long radial grooves 91 and four short radial grooves 92 are formed alternately in a radial manner from the junction hole 90. In the assembled state of the microreactor 80, the junction hole 90 and the radial grooves 91, 92 form a circular space to be a junction region 90 and radial flow paths through which the solutions A, B flow. Further, through-holes 95, are respectively formed in a thickness direction of the junction block 82 from the tip ends of the long radial grooves 91 among eight radial grooves 91, 92, and these through-holes 95 are communicated with the above-mentioned outside annular groove 86 formed in the supply block 81. Similarly, through-holes 96, are respective formed in a thickness direction of the junction block 82 from the tip ends of the short radial grooves 92, and the through-holes 96 are communicated with the inside annular groove 85 formed in the supply block 81.

Further, at a center of the reaction block 83, one through-hole 93 communicated with the junction hole 90 is formed in a thickness direction of the reaction block 83, and the through-hole 93 becomes a micro-flow path.

Because of this, the solution A flows through a supply flow path composed of the through-hole 88 of the supply block 81, the outside annular groove 86, the through-holes 95 of the junction block 82, and the long radial grooves 91, and divided into four divided flows to reach the junction region 90. On the other hand, the solution B flows through a supply flow path composed of the through-hole 87 of the supply block 81, the inside annular groove 85, the through-holes 96 of the junction block 82, and the short radial grooves 92, and divided into four divided flows to reach the junction region 90. In the junction region 90, the divided flow of the solution A and the divided flow of the solution B are joined with having the respective kinetic energy, and thereafter, flows in the microflow path 93 with the flow direction changed by 90°.

In addition, a reactor having a Y-shaped channel, a reactor having a cylinder-shaped channel, and these reactors to which a modification is made so that, when flows of two liquids reach the exit in a state of laminar flow, separation between them is achieved can be utilized (see, e.g., JP-A-2005-307154, paragraphs [0049] to [0052] and FIGS. 1 to 4). Moreover, it is also preferable to use a two-dimensional microreactor and a three-dimensional microreactor in which the angle of contact between two liquids and the number of contact flow paths are appropriately controlled (see, e.g., JP-A-2007-39643, paragraphs [0044] to [0050]).

All of the devices shown in FIGS. 1 to 8 can be used suitably in the present invention. Of these devices, the devices shown in FIGS. 5 to 8 are preferable to the others, and the device shown in FIG. 8 is further preferred. By using any of these devices in the production process of the present invention in particular, it becomes feasible to achieve performance excellence in swift mixing of an organic pigment solution with a precipitation medium at the time of precipitation of fine particles in the presence of polymerizable compounds and further improvements in dispersion stabilization and storage stability of organic fine particles to which the polymerizable compounds are fixed through their polymerization. In addition, those devices allow control or prevention of clogging of flow-paths, and have high production consistency and excellent numbering-up suitability, so they are especially suitable for preparation of an organic fine particle dispersion liquid used in the production method of the present invention.

In the present invention, it is practicable to adopt a method of preparing in advance a dispersion liquid of organic fine particles (fine particles of sizes on the order of nanometers from about 10 nm to about 100 nm) containing a high molecular compound, and then performing the heating treatment after giving a pause, or continuously performing the heating treatment without a pause after the preparation. When the organic fine particle dispersion liquid prepared further undergoes processes of purification, condensation and the like, the heating treatment in the present invention may be carried out at any stage of these processes, and it doesn't matter what order the heating treatment and these processes are performed in. For instance, it is practicable to adopt a mode in which an organic fine particle dispersion is cleaned and then concentrated after it undergoes heating inside a channel, a mode in which a dispersion liquid having undergone a cleaning process is made to flow into a channel again and heated, and then concentrated, a mode in which a dispersion liquid having undergone a cleaning process and a condensation process is made to flow into a channel and heated, or the like. In point of convenience and facilitation of operations, the mode of performing cleaning and condensation processes after heating inside a channel is preferred.

The organic fine particle dispersion can be made into organic fine particle solid by drying. The method for drying is not particularly limited and may be any of commonly used ones. It is possible to employ, e.g., freeze drying, evaporation under reduced pressure (evaporator), combination thereof, or the like. The organic compound content in organic fine particles after conversion into the solid is not particularly limited, but preferably from 5 mass % to 90 mass %, more preferably from 20 mass % to 80 mass %.

The organic pigment fine particles and the dispersion thereof produced in the present invention can be used as coloring agents in various materials, such as ink-jet ink, paint, printing ink, toner, ink for writing, transparent coatings for film, cosmetics, plastics, rubber and textile printing agents. In particular, they can provide excellent-quality ink-jet ink and paint. To be concrete, the ink-jet recording ink or paint according to the present invention preferably contains in an aqueous medium both the organic fine particles obtained by using the organic fine particle dispersion and the high molecular compound. More specifically, the organic pigment fine particle dispersion obtained by the production method of the present invention is purified by centrifugal separation and/or ultrafiltration, and then concentrated. To the thus processed dispersion, a water-soluble high boiling organic solvent, such as glycerin or glycol, is added. By further addition of additives for pH, surface tension and viscosity adjustments or antisepsis as required, the dispersion according to the present invention can be made into excellent-quality ink-jet ink or paint. In addition, the dispersion according to the present invention can be made into a dispersion for high-performance color filter by carrying out separation and concentration and making adjustments in liquid properties as appropriate.

According to the production method of the present invention, an organic fine particle dispersion which contains organic fine particles fined down to nanometer sizes and sharp in the peak of particle diameter distribution (monodisperse property), and furthermore, has very high dispersion stability can be obtained at low cost and with high efficiency. Further, preparation of an ink-jet recording ink and a paint each having a transparent-and-vivid hue becomes feasible by use of the organic fine dispersion having the foregoing excellent properties.

The present invention will be described in more detail based on the following examples, but the invention is not intended to be limited thereto.

EXAMPLES

Example 1

In 1200 mL, of dimethyl sulfoxide, 80 g of Pigment Yellow 128 (CROMOPHTAL YELLOW 8GNP, manufactured by Ciba Specialty Chemicals), 63 g of a 28% methanol solution of sodium methoxide (manufactured by Wako Pure Chemical Industries, Ltd.), 64 g of AQUARON KH-10 (trade name, manufactured by Dai-ichi Kogyo Seiyaku Co., Ltd.) and 20 g of polyvinyl pyrrolidone K-30 (trade name; a high molecular compound; molecular weight 40,000; manufactured by Tokyo Chemical Industry Co., Ltd.) were dissolved at room temperature. The thus prepared solution was symbolized by IE liquid. And distilled water was symbolized by IIE liquid. As a microreactor-apparatus, the three-dimensional microreactor-apparatus shown in FIG. 8 which had the following division number (the number of flow paths) was used.

Number (n) of supply flow paths . . . Two kinds of reaction liquids were each divided into 3 flow paths (A total of 6 flow paths were joined together. Incidentally, the apparatus shown in FIG. 8 is designed so that a total of 8 flow paths, four flow paths for each liquid, join together.)

Width (W) of supply flow paths 91 and 92 . . . Each 400 μm

Depth (H) of supply flow paths 91 and 92 . . . Each 400 μm

Diameter (D) of combination region 90 . . . 800 μm

Diameter (R) of micro-flow path 93 . . . 800 μm

Length (L) of micro-flow path 93 . . . 10 mm

Crossing angle between central axes of each supply flow path 91 or 92 and a micro-flow path 93 in the combination region 90 . . . 90°

Material of apparatus. Stainless steel (SUS304)

Channel machining method . . . Electric spark micromachining was performed. Sealing of three parts, a supply block 81, a combination block 82 and a reaction block 83, was carried out by mirror-finished metallic surface sealing. Two Teflon (trade mark) tubes each having a length of 50 cm and an equivalent diameter of 1 mm were tied to two entrances by means of connectors, respectively, and to the ends thereof syringes filled respectively with IE liquid and IIE liquid were fastened. And these syringes were set in a pump. To the exit of each connector was joined a Teflon™ tube having a length of 10 m and an equivalent diameter of 8 mm.

Numerals in FIGS. 1-1 to 8 are explained below.

10, 20, 30, and 40 represent a body of reactor; 11, 12, 21, 22, 31, 32, 41, and 42 represent an introducing port; 13 and 33 represent a channel; 13a, 13b, 23a, 23b, 33a, 33b, 43a, and 43b represent an introducing channel; 13c, 23c, 33c, and 43c represent a reaction channel; 13d, 23d, 33d, and 43d represent a fluid confluence point; 33e and 43e represent a fluid dividing point; 33f, 33g, 43f, and 43g represent a discharge channel; 14, 24, 34, 35, 44, and 45 represent a discharge port; 50, 60, 70, and 80 represent a micro-reactor; 51, 52, 61, 62, 71, and 72 represent a supply flow path for a solution; 51A, 61A, and 71A represent a divided supply flow path; 53, 63, and 73 represent a micro-flow path; 54, 64, and 74 represent a junction region; 81 represents a supply block; 82 represents a junction block; 83 represents a reaction block; 86 represents an outside annular groove; 85 represents an inside annular groove; 87 and 88 represent a through-hole of a supply block; 90 represents a junction hole (a junction region); 91 represents a long radial groove; 92 represents a short radial groove; 95 and 96 represent a through-hole of a junction block; and 93 represents a through-hole of a reaction block (micro-flow path).

The microreactor apparatus configured as specified above was used, and the 1E liquid was sent out at a feed speed of 40 mL/min and IIE liquid at a feed speed of 160 mL/min under a condition that the 6-meter long segment (the segment between the points of 1 m and 7 m distant from the exit) of the Teflon (trade mark) tube (inside equivalent diameter: 8 mm) connected to the exit of the connector was immersed in an oil bath kept at a temperature of 90° C. The temperature of the fine particle dispersion liquid of precipitated Pigment Yellow 128 was 23° C. And the temperature of the liquid coming out from the Teflon (trade mark) tube was in a range of 85° C. to 90° C. Although the inside temperature of the Teflon (trade mark) tube was not measured, it was thought that the inside temperature reached to a temperature close to 90° C. at an early part of the flow-path because the smallness of the flow-path diameter allowed speedy heat exchange. The dispersion liquid of Pigment Yellow 128 obtained from the tip of the exit of the tube was collected. The heating time of the liquid was calculated at about 90 seconds.

The thus collected dispersion liquid was purified by use of an ultrafiltration device (UHP-62K, trade name, made by Advantec Toyo Kabusiki Kaisha, molecular weight cut off: $5 \times 10^4$) as it was kept at a constant volume by displacement of the filtrate by distilled water, and then concentrated until the pigment concentration reached 5.0 mass %. The viscosity of the dispersion liquid having the pigment concentration of 5.0 mass % was found to be 5.4 mPaS, the volume-average particle diameter Mv of the pigment particles in this liquid was found to be 25.1 nm, and the volume-average particle diameter Mv/number-average particle diameter Mn ratio as an indicator of monodisperse degree was found to be 1.42 (Herein, the volume-average particle diameter (Mv) and monodisperse degree (Mv/Mn) of pigment particles were determined with NANOTRACK UPA-EX150 (trade name), made by Nikkiso Co., Ltd., under conditions that the pigment concentration was diluted to 0.2 mass % by addition of distilled water and measurement was made at room temperature (about 25° C.). Likewise, these physical properties were evaluated in the following Examples and Comparative Examples too.).

When this dispersion liquid was further subjected to heated aging tests at a heating temperature of 60° C. for time periods of 100 hours and 240 hours, respectively, the viscosity values were found to be 5.4 mPa·S and 5.4 mPa·S, the Mv values 25.2 nm and 25.2 nm, and the Mv/Mn values 1.45 and 1.46. In other words, there occurred no significant changes in those properties. In addition, no precipitate was observed.

Example 2

A dispersion liquid of Pigment Yellow 128 was prepared in the same manner as in Example 1, except that the 1-meter long segment (the segment between the points of 4 m and 5 m distant from the exit) of the Teflon (trade mark) tube) connected to the exit of the connector was kept in the condition of being immersed in the oil bath kept at a temperature of 90° C. Although the inside temperature of the Teflon (trade mark) tube was not measured, it was thought that the inside temperature reached to a temperature close to 90° C. at an early part of the flow-path because the smallness of the flow-path diameter allowed speedy heat exchange. The heating time of the liquid was calculated at about 15 seconds. The viscosity of the dispersion liquid concentrated to a pigment concentration of 5.0 mass % after purification was found to be 7.2 mPa·S. The volume-average particle diameter Mv was found to be 24.8 nm, and the volume-average particle diameter Mv/number-average particle diameter Mn ratio as an indicator of monodisperse degree was found to be 1.37. Successively thereto, this dispersion liquid was subjected to heated aging tests at a heating temperature of 60° C. for time periods of 100 hours and 240 hours, respectively. As test results, it was found that the viscosity values were 6.1 mPa·S and 5.8 mPa·S, the Mv values 25.1 nm and 26.3 nm, and the Mv/Mn values 1.44 and 1.48. In other words, there occurred slight changes in those properties. However, no precipitate was observed.

Comparative Example 1

A dispersion liquid of Pigment Yellow 128 was prepared in the same manner as in Example 1, except that the heating was not given to the Teflon (trade mark) tube. The viscosity of the dispersion liquid concentrated to a pigment concentration of 5.0 mass % after purification was found to be 11.5 mPa·S, the volume-average particle diameter Mv was found to be 23.8 nm, and the volume-average particle diameter Mv/number-average particle diameter Mn ratio as an indicator of monodisperse degree was found to be 1.37. Successively thereto, this dispersion liquid was subjected to heated aging tests at a heating temperature of 60° C. for time periods of 100 hours and 240 hours, respectively. As a result, there occurred changes in viscosity value to 8.1 mPa·S and further to 7.4 mPa·S, changes in Mv value to 25.2 nm and further to 28.2 nm, and changes in Mv/Mn value to 1.41 and further to 1.55. These results indicate that the heating operation in Example 1 produces an improvement in dispersion stability of the dispersion liquid. However, no precipitate was observed.

Comparative Example 2

A dispersion liquid of Pigment Yellow 128 was prepared in the same manner as in Example 1, except that the addition of polyvinyl pyrrolidone (high molecular compound) was omitted. This liquid was concentrated in the same manner as in Example 1 until the pigment concentration reached 5.0 mass %. The thus concentrated dispersion liquid was subjected to heated aging tests at a heating temperature of 60° C. for time periods of 100 hours and 240 hours, respectively. Test results obtained are shown in Table 1. As can be seen from Table 1, the heating treatment in the absence of polyvinyl pyrrolidone as a high molecular compound constituted no contribution to improvements in dispersion stability.

Reference Example 1

A 200 ml portion of the dispersion liquid of Pigment Yellow 128 prepared by the method of Comparative Example 1, wherein the tube had undergone no heating, was placed in a 500 ml of three-necked flask equipped with a thermometer, heated at an outside temperature of 90° C., and then cooled. During these operations, the temperature inside the flask was raised from 23° C. as room temperature to 80° C. over 12 minutes, kept in a range of 80° C. to 82° C. for 2 minutes, and then lowered to 23° C. over 18 minutes by water cooling. The thus processed dispersion liquid was concentrated by the same method as in Example 1 until the pigment concentration reached 5 mass %, and then examined on the viscosity, Mv and Mv/Mn values before and after the heated aging tests. Test results obtained are shown in Table 1. These results indicate that the heating method using a flow path as in Example 1 is superior to the heating method using a flask in retention of particle size and monodisperse properties.

Example 3

A dispersion liquid was prepared in the same manner as in Example 1, except that the composition of IE liquid used in Example 1 was changed to a composition containing 80 g of 2,9-dimethylquinacridone (HOSTAPERM PINK. E, trade name, a product of Clariant), 181 g of a 28% methanol solution of sodium methoxide (manufactured by Wako Pure Chemical Industries, Ltd.), 64 g of Aqualon KH-10 (trade name, manufactured by Dai-ichi Kogyo Seiyaku Co., Ltd.), 16 g of polyvinyl pyrrolidone K30 (trade name, a high molecular compound having molecular weight of 40,000, manufactured by Tokyo Chemical Industry Co., Ltd.) and 1,200 mL, of dimethyl sulfoxide. The thus prepared dispersion liquid was concentrated and subjected to heated aging tests under the same conditions as in Example 1. The viscosity, Mv and Mv/Mn values measured are shown in Table 1.

Comparative Example 3

A pigment dispersion liquid was prepared in the same manner as in Example 2, except that the heating was not given to the Teflon (trade mark) tube. The thus prepared dispersion liquid was concentrated and subjected to heated aging tests under the same conditions as in Example 1. The viscosity, Mv and Mv/Mn values measured are shown in Table 1.

Comparative Example 4

A pigment dispersion liquid was prepared in the same manner as in Example 2, except that the addition of polyvinyl pyrrolidone (high molecular compound) was omitted. The thus prepared dispersion liquid was concentrated and subjected to heated aging tests under the same conditions as in Example 1. The viscosity, Mv and Mv/Mn values measured are shown in Table 1.

Example 4

The pigment dispersion liquid (23° C.) prepared by the method of Comparative Example 4, namely the method of carrying out no heating treatment, was charged into a syringe, and the syringe was connected to a Teflon (trade mark) tube having a length of 10 m and an inside equivalent diameter of 8 mm. And the dispersion liquid was sent out at a feed velocity of 2 mL/min from the syringe and made to flow into the Teflon (trade mark) tube under a condition that the 6-meter long segment (the segment between the points of 1 m and 7 m distant from the exit) of the Teflon (trade mark) tube was immersed in an oil bath kept at a temperature of 90° C. Although the inside temperature of the Teflon (trade mark) tube was not measured, it was thought that the inside temperature reached to a temperature close to 90° C. at an early part of the flow-path because the smallness of the flow-path diameter allowed speedy heat exchange. The heating time of the liquid was calculated at about 150 seconds. The thus obtained dispersion liquid was purified, concentrated, and then subjected to heated aging tests under the same conditions as in Example 1. The viscosity, Mv and Mv/Mn values measured are shown in Table 1.

Comparative Example 5

A mixture composed of 20 mass % of Pigment Yellow 128 (CROMOPHTAL, YELLOW 8GNP, trade name, manufactured by Ciba Specialty Chemicals), 15 mass % of styrene-acrylic acid-methyl methacrylate copolymer (molecular weight 10,000; acid value 160), 10 mass % of glycerin and 55 mass % of ion exchange water was prepared, and then pulverized for 3 hours at 40° C. by means of a beads mill loaded with 0.3 mm zirconia beads of the amount occupying 60% of the mill's volume, and further diluted with water. Thus, a yellow pigment dispersion liquid having a pigment concentration of 1 mass % was obtained. The average particle diameter Mv of the pigment particles in this dispersion liquid was 120 nm, and the Mv/Mn value was 1.80. In accordance with the same method as used in Example 4, this dispersion liquid was sent out at a feed velocity of 200 mL/min so as to flow into the tube and subjected to the heating treatment. The heating time was calculated at about 90 seconds. Mv and Mv/Mn values of pigment particles in the thus treated dispersion liquid were found to be 145 nm and 2.05, respectively.

Example 5

A dispersion liquid of Pigment Yellow 128 was prepared in the same manner as in Example 1, except that the tube (inside equivalent diameter: 8 mm) connected to the exit of the connector used in Example 1 is replaced with a tube having an inside equivalent diameter of 12 mm. With respect to the viscosity and the particle diameter, initial values and changes by an aging test were measured. Results are shown in Table 1.

Example 6

A dispersion liquid of Pigment Yellow 128 was prepared in the same manner as in Example 1, except that the tube (inside equivalent diameter: 8 mm) connected to the exit of the connector used in Example 1 is replaced with a tube having an inside equivalent diameter of 20 mm. With respect to the viscosity and the particle diameter, initial values and changes by an aging test were measured. Results are shown in Table 1.

When each paint was pipetted off and dropped onto a glass plate, and further dried by 2-hour heating at 40° C., a transparent-and-vivid coating film was formed.

Example 9

In 50 mL of tetrahydrofuran (THF), 1.0 g of Exemplified Compound (1-1) and 0.5 g polyvinyl pyrrolidone K30 (trade name, a high molecular compound having molecular weight of 40,000, manufactured by Tokyo Chemical Industry Co., Ltd.) were dissolved together with 1.5 g of Aqualon KH-10 (trade name, manufactured by Dai-ichi Kogyo Seiyaku Co., Ltd.) at room temperature (to prepare IA liquid). And distilled

TABLE 1

|  | Viscosity of a 5.0 mass % dispersion liquid (mPa · s) | | | Average partcle diameter (Mv; nm) | | | Mv/Mn | | | |
| --- | --- | --- | --- | --- | --- | --- | --- | --- | --- | --- |
|  | Initial value | 60° C. 100 hours | 60° C. 240 hours | Initial value | 60° C. 100 hours | 60° C. 240 hours | Initial value | 60° C. 100 hours | 60° C. 240 hours | Forming of precipitate |
| Example 1 | 5.4 | 5.4 | 5.3 | 25.1 | 25.2 | 25.2 | 1.42 | 1.45 | 1.46 | None |
| Example 2 | 7.2 | 6.1 | 5.8 | 24.8 | 25.1 | 26.3 | 1.40 | 1.44 | 1.48 | None |
| Comparative example 1 | 11.5 | 8.1 | 7.4 | 23.8 | 25.2 | 28.2 | 1.37 | 1.41 | 1.55 | None |
| Comparative example 2 | 3.7 | 3.8 | 3.8 | 22.9 | 25.4 | 28.8 | 1.39 | 1.43 | 1.60 | Observed |
| Reference example 1 | 6.6 | 6.2 | 5.9 | 28.7 | 28.9 | 28.9 | 1.61 | 1.63 | 1.62 | None |
| Example 3 | 3.8 | 3.7 | 3.7 | 24.3 | 24.5 | 24.5 | 1.41 | 1.44 | 1.44 | None |
| Comparative example 3 | 9.8 | 7.3 | 6.1 | 23.3 | 25.8 | 27.8 | 1.44 | 1.46 | 1.51 | None |
| Comparative example 4 | 3.4 | 3.3 | 3.4 | 21.8 | 25.5 | 26.9 | 1.40 | 1.53 | 1.61 | None |
| Example 4 | 5.2 | 5.2 | 5.3 | 25.8 | 25.8 | 25.9 | 1.44 | 1.45 | 1.46 | None |
| Example 5 | 5.7 | 5.7 | 5.8 | 25.8 | 25.7 | 25.9 | 1.47 | 1.49 | 1.50 | None |
| Example 6 | 6.0 | 5.9 | 6.0 | 27.2 | 27.1 | 27.2 | 1.52 | 1.53 | 1.53 | None |

Example 7

Ink-jet inks having the following composition were prepared using the dispersion liquids of 5% concentration described in Examples 1 to 4, respectively:

| Organic pigment | 3.5% |
| --- | --- |
| OLFINE E1010 | 2.0% |
| Glycerin | 10% |
| Water | 84.5% |

Each of the ink-jet inks prepared was used as the ink of an inkjet printer PM-D600 made by SEIKO EPSON CORPORATION and subjected to droplet-driving tests. As a result, no clogging occurred and good-quality prints were obtained.

Example 8

Paints were prepared by mixing a resin, JURYMER ET-410 (concentration: 30%, a product of NIHON JIJNYAKU CO., LTD.), with the dispersion liquids having a concentration of 5% described in Examples 1 to 4, respectively, in the following ratio:

Organic pigment (5%): Resin (30%)=2:1.

water was employed as IIA liquid. These liquids were each passed through a 0.45-μm microfilter (made by SARTORIUS AG) to eliminate impurities including dust. An organic fine particle dispersion liquid was prepared from these liquids by using the same apparatus and operations as in Example 4. Measurement results on initial values of particle diameters and monodisperse properties of this dispersion liquid and their corresponding values after the heating tests are shown in Table 2.

Example 10

An organic fine particle dispersion liquid was prepared from the same ingredients as used in Example 9, except that 0.25 g portion of polyvinyl pyrrolidone was replaced by the same amount of polyvinyl alcohol (low saponification degree, polymerization degree of 1,000) and 0.1 g of terephthal dialdehyde (low molecular compound having cross-linkable functional groups) was further added, by using the same apparatus and operations as in Example 4. Measurement results on initial values of particle size and monodisperse properties of this dispersion liquid and their corresponding values after the heating tests are shown in Table 2.

Examples 11 to 16

Organic fine particle dispersions were prepared by replacing the high molecular compound/cross-linkable compound combination used in Example 10 with the combinations shown in Table 2, respectively, wherein the other conditions were the same as in Example 4.

TABLE 2

| Example | Organic compound | High molecular compound | Cross-linkable compound | Average particle diameter (Mv) | | | Mv/Mn | | |
|---|---|---|---|---|---|---|---|---|---|
| | | | | Initial value | 60° C. 100 h | 60° C. 240 h | Initial value | 60° C. 100 h | 60° C. 240 h |
| 9 | I-1 | PVP (100) | — | 35.5 | 32.1 | 32.2 | 1.45 | 1.48 | 1.49 |
| 10 | I-1 | PVP (50) + Polyvinyl alcohol (50) | Terephthal dialdehyde | 41.5 | 42.9 | 42.8 | 1.55 | 1.52 | 1.53 |
| 11 | III-2 | PVP (100) | — | 45.1 | 44.9 | 44.8 | 1.44 | 1.46 | 1.46 |
| 12 | III-2 | Polyvinyl alcohol (100) | 1,4-butanediol diglycidyl ether | 39.9 | 38.2 | 38.4 | 1.41 | 1.45 | 1.45 |
| 13 | I-1 | PVP (70) + Triethanolamine (30) | 1,4-butanediol diglycidyl ether | 29.6 | 31.5 | 32.1 | 1.49 | 1.52 | 1.51 |
| 14 | I-2 | PVP (70) + Triethanolamine (30) | Terephthal dialdehyde | 34.4 | 34.6 | 34.5 | 1.44 | 1.42 | 1.41 |
| 15 | I-1 | PVP (50) + 1,5-Pentanediol (50) | 1,2,7,8-diepoxyoctane | 38.9 | 40.1 | 40.3 | 1.46 | 1.46 | 1.47 |
| 16 | I-1 | PVP (50) + 1,5-Pentanediol (50) | 1,2,4,5-benzene-tetracarboxylic dianhydride | 33.3 | 33.4 | 33.4 | 1.41 | 1.43 | 1.44 |

It can be seen from these results that all the organic fine particle dispersions obtained by the production method of the present invention were superior in dispersion stabilization and storage stability. In Examples 10 and 12 in particular, cross-links were formed between hydroxyl groups of polyvinyl alcohol as a high molecular compound and the low molecular compounds having cross-linkable functional groups, and thereby the present invention achieved excellent effects. In addition, triethanolamine in each of Examples 13 and 14 or 1,5-pentanediol in each of Examples 15 and 16 was cross-linked with another low molecular compound having cross-linkable functional groups, and thereby the present invention exhibited excellent effects.

Example 17

As in Example 9, 1.0 g of Exemplified Compound (III-2) in place of Exemplified Compound (I-1), a mixture of styrene and divinylbenzene (mixing ratio=90:10, total amount: 0.5 g), 0.5 g of VPE0201 (trade name, manufactured by Wako Pure Chemical Industries, Ltd.), 0.1 g of polyvinyl pyrrolidone K30 (trade name, a high molecular compound having molecular weight of 40,000, manufactured by Tokyo Chemical Industry Co., Ltd.), 0.1 g of terephthaldialdehyde and 0.2 g of polyvinyl alcohol (low saponification degree, polymerization degree of 1,000) were dissolved in 50 mL of tetrahydrofuran (THF) (to prepare IB liquid). And distilled water was employed as IIB liquid. These liquids were each passed through a 0.45-μm microfilter (made by SARTORIUS AG) to eliminate impurities including dust. An organic fine particle dispersion liquid was prepared from these liquids by using the same apparatus and operations as in Example 1. And it was found that the average particle diameter of the thus prepared dispersion liquid was 42.1 nm in its initial state, 44.4 nm after a lapse of 100 hours at 60° C. and 44.8 nm after a lapse of 240 hours at 60° C. Further, it was found that the Mv/Mn value of the dispersion liquid prepared was 1.47 in the initial state, 1.45 after a lapse of 100 hours at 60° C. and 1.45 after a lapse of 240 hours at 60° C. These measurement results indicate that a stable dispersion of organic fine particles can be obtained even when cross-linking reaction is performed simultaneously with polymerization reaction.

Examples 18 to 23

Organic fine particle dispersion liquids were prepared under the same conditions as in Example 1 or 3, except that the ingredients used in Example 1 or 3 were replaced by those shown in Table 3, respectively.

TABLE 3

| Example | Organic pigment | High molecular compound | Cross-linkable compound | Additive | Polymerization Initiator |
|---|---|---|---|---|---|
| 1 | PY128 | PVP (100) | — | — | — |
| 18 | PY128 | PVP (50) + 1,5-Pentanediol (50) | 1,2,4,5-benzene-tetracarboxylic dianhydride | — | — |
| 19 | PY128 | PVP (50) + Polyvinyl alcohol (50) | 1,2,4,5-benzene-tetracarboxylic dianhydride | — | — |
| 20 | PY128 | PVP (70) + Triethanolamine (30) | 1,2,7,8-diepoxyoctane | — | — |
| 3 | PR122 | PVP (100) | — | — | — |
| 21 | PR122 | PVP (50) + 1,5-Pentanediol (50) | Terephthal dialdehyde | — | — |
| 22 | PR122 | PVP (50) + 1,12-Diamino-dodecane (50) | 1,2,4,5-benzene-tetracarboxylic dianhydride | — | — |

TABLE 3-continued

| 23 | PR122 | PVP (50) + Polyvinyl alcohol (30) + 1,5-Pentanediol (20) | 1,2,4,5-benzene-tetracarboxylic dianhydride | *Styrene (80) + 1,4-divinylbenzene (20) | *K$_2$S$_2$O$_8$ (1) |
|---|---|---|---|---|---|

| | Average particle diameter (Mv; nm) | | | Mv/Mn | | | |
|---|---|---|---|---|---|---|---|
| Example | Initial value | 60° C. 100 h | 60° C. 240 h | Initial value | 60° C. 100 h | 60° C. 240 h | Forming of precipitate |
| 1 | 25.1 | 25.2 | 25.2 | 1.42 | 1.45 | 1.46 | None |
| 18 | 26.5 | 26.8 | 26.9 | 1.49 | 1.52 | 1.54 | None |
| 19 | 28.8 | 29.0 | 29.2 | 1.44 | 1.45 | 1.46 | None |
| 20 | 30.1 | 30.3 | 30.5 | 1.49 | 1.49 | 1.52 | None |
| 3 | 24.3 | 24.5 | 24.5 | 1.41 | 1.44 | 1.44 | None |
| 21 | 28.3 | 28.5 | 28.5 | 1.39 | 1.39 | 1.40 | None |
| 22 | 32.3 | 32.6 | 32.9 | 1.45 | 1.46 | 1.46 | None |
| 23 | 24.6 | 24.6 | 24.6 | 1.38 | 1.38 | 1.39 | None |

*assuming the amount of the pigment to be 100.

It can be seen from these results that all of the organic pigment fine particle dispersions obtained by the production method of the present invention were excellent in dispersion and storage stabilities. In Example 23 in particular, the radical-polymerizable compound was further added and the heating treatment was performed in the presence of such a polymerization initiator. Nevertheless, high dispersion and storage stabilities were achieved in common with the other cases.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2007-291354 filed in Japan on Nov. 8, 2007, and Patent Application No. 2008-156356 filed in Japan on Jun. 16, 2008, each of which is entirely herein incorporated by reference.

What we claim is:

1. A method of producing a dispersion of organic fine particles, the particles having a volume average particle diameter (Mv) of 10 nm to 100 nm, wherein the method comprises the steps of:
   preparing a raw dispersion containing organic fine particles and a high molecular compound, and simultaneously or separately,
   subjecting the raw dispersion to heating treatment under flowing through a channel to form a resulting dispersion of organic fine particles,
   wherein the raw dispersion is obtained by a build-up process in the presence of the high molecular compound,
   wherein the high molecular compound has a molecular weight of 1,000 or more and has a cross-linkable functional group, and
   wherein the heating treatment is carried out at a temperature in a range of 50° C. to 100° C.

2. The method of producing an organic fine particle dispersion as described in claim 1, wherein the organic fine particle dispersion liquid further contains a compound having a cross-linkable functional group.

3. The method of producing an organic fine particle dispersion as described in claim 1, wherein the high molecular compound has a cross-linkable functional group.

4. The method of producing an organic fine particle dispersion as described in claim 2, wherein the high molecular compound, or the compound having a cross-linkable functional group, or both are made to form cross-links through reaction of the cross-linkable functional group during the step of heating treatment.

5. The method of producing an organic fine particle dispersion as described in claim 4, wherein the cross-links are formed from combination of at least one functional group selected from the group consisting of an aldehyde group, an epoxy group and a carboxylic anhydride structure with at least one functional group selected from the group consisting of a hydroxyl group and an amino group.

6. The method of producing an organic fine particle dispersion as described in claim 1, wherein the volume average particle diameter (Mv) of organic fine particles is from 10 nm to 50 nm.

7. The method of producing an organic fine particle dispersion as described in claim 1, wherein the channel has an equivalent diameter of 0.1 mm to 16 mm in a segment where the heating treatment is carried out.

8. The method of producing an organic fine particle dispersion as described in claim 1, wherein the organic fine particle dispersion is an aqueous dispersion liquid.

9. The method of producing an organic fine particle dispersion as described in claim 1, wherein the high molecular compound is soluble in water.

10. The method of producing an organic fine particle dispersion as described in claim 1, wherein the heating treatment is carried out at a temperature of 50° C. to 100° C.

11. The method of producing an organic fine particle dispersion as described in claim 1, wherein duration of the heating treatment which the dispersion liquid flowing through the channel undergoes is 20 seconds or more.

12. The method of producing an organic fine particle dispersion as described in claim 1, wherein the organic fine particle dispersion liquid containing a high molecular compound is a dispersion liquid prepared by mixing a solution of an organic compound dissolved by use of an acid or an alkali with a precipitation solvent in the presence of the high molecular compound inside a channel of a microreactor apparatus and forming a precipitate as fine particles of the organic compound.

13. The method of producing an organic fine particle dispersion as described in claim 12, wherein the step of precipitating the fine particles and the subsequent heating treatment step under feeding the dispersion liquid through the channel are performed under a series of solution feedings by use of the microreactor apparatus.

14. The method of producing an organic fine particle dispersion as described in claim 12, wherein the channel of the microreactor apparatus is designed to have an equivalent diameter of 1 mm or less.

15. The method of producing an organic fine particle dispersion as described in claim 1, wherein the organic fine particles are fine particles of an organic pigment.

16. The method of producing a dispersion of organic fine particles as described in claim 1, wherein in the steps of preparing the raw dispersion and subjecting the raw dispersion to heating treatment, an aqueous medium and a solution containing an organic material are provided, wherein the high molecular compound is contained in the aqueous medium and/or the organic material solution, the aqueous medium and the organic material solution are introduced into the channel so that the aqueous medium and the organic material solution contact each other in the channel, in order to generate the organic fine particles upon flowing in the channel, and the heat treatment is conducted in the channel.

17. The method of producing a dispersion of organic fine particles as described in claim 1, wherein in the steps of preparing the raw dispersion and subjecting the raw dispersion to heating treatment, an aqueous medium and a solution containing an organic material are provided, wherein the high molecular compound is contained in the aqueous medium and/or the organic material solution, the aqueous medium and the organic material solution are introduced into the channel so that the aqueous medium and the organic material solution contact each other in the channel, in order to generate the organic fine particles upon flowing in the channel, and the raw dispersion is introduced into a second channel, and the heat treatment is conducted in the second channel.

18. The method of producing a dispersion of organic fine particles as described in claim 1, wherein the high molecular compound is selected from the group consisting of polyvinyl pyrrolidone, polyvinyl alcohol, polyvinyl methyl ether, polyethylene oxide, polyethylene glycol, styrene/acrylic acid salt copolymer, styrene/methacrylic acid salt copolymer, acrylic acid ester/acrylic acid salt copolymer, acrylic acid ester/methacrylic acid salt copolymer, methacrylic acid ester/acrylic acid salt copolymer, methacrylic acid ester/methacrylic acid salt copolymer and a combination thereof.

* * * * *